(12) United States Patent
Nishio et al.

(10) Patent No.: US 12,150,160 B2
(45) Date of Patent: *Nov. 19, 2024

(54) WIRELESS COMMUNICATION TERMINAL DEVICE, WIRELESS COMMUNICATION BASE STATION DEVICE, AND RESOURCE REGION SETTING METHOD

(71) Applicant: Sun Patent Trust, New York, NY (US)

(72) Inventors: Akihiko Nishio, Osaka (JP); Seigo Nakao, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,811

(22) Filed: Aug. 4, 2023

(65) Prior Publication Data

US 2023/0379959 A1 Nov. 23, 2023

Related U.S. Application Data

(63) Continuation of application No. 16/862,353, filed on Apr. 29, 2020, now Pat. No. 11,765,760, which is a
(Continued)

(30) Foreign Application Priority Data

Mar. 16, 2009 (JP) .................................. 2009-063031

(51) Int. Cl.
*H04W 72/542* (2023.01)
*H04L 5/00* (2006.01)
*H04L 27/26* (2006.01)

(52) U.S. Cl.
CPC .......... *H04W 72/542* (2023.01); *H04L 5/001* (2013.01); *H04L 5/0055* (2013.01);
(Continued)

(58) Field of Classification Search
CPC ............ H04W 72/542; H04W 72/0453; H04L 5/001; H04L 5/0055; H04L 5/0016; H04L 27/2634; H04L 27/26524; H04L 27/265
See application file for complete search history.

(56) References Cited

U.S. PATENT DOCUMENTS 8,351,974 B2 * 1/2013 Ahn ...................... H04L 1/0032
370/320
8,494,572 B2 7/2013 Chen et al.
(Continued)

OTHER PUBLICATIONS

Hearing Notice, dated Dec. 12, 2023, for India Patent Application No. 201828045614. (2 pages).
(Continued)

*Primary Examiner* — Redentor Pasia
(74) *Attorney, Agent, or Firm* — Seed IP Law Group LLP

(57) ABSTRACT

A terminal capable of reducing the resource regions in an uplink component band without increasing signaling even if a plurality of acknowledgment signals to downlink data transmitted respectively in a plurality of downlink component bands are transmitted from one uplink component band. A terminal (200) for making communication using the plurality of downlink component bands, wherein a PCFICH reception section (208) obtains CFI information indicating the number of symbols used for a control channel to which resource allocation information relating to downlink data addressed to a device is allocated for each of the downlink component bands, a mapping section (214); sets a resource region to which an acknowledgment signal to the downlink data is allocated for each of the plurality of downlink component bands according to the CFI information of each of the downlink component bands in an uplink component band set to the device, and maps the acknowledgment
(Continued)

signals into the resource regions corresponding to the downlink component bands used for the allocation of the downlink data.

8 Claims, 10 Drawing Sheets

Related U.S. Application Data continuation of application No. 13/256,618, filed as application No. PCT/JP2010/001848 on Mar. 15, 2010, now Pat. No. 10,681,709.

(52) U.S. Cl.
CPC .... *H04L 27/2634* (2013.01); *H04L 27/26524* (2021.01); *H04L 5/0016* (2013.01)

(56) References Cited

U.S. PATENT DOCUMENTS

| | | | |
|---|---|---|---|
| 9,591,634 B2* | 3/2017 | Pan | H04L 5/0091 |
| 11,974,288 B2* | 4/2024 | Bala | G06Q 20/02 |
| 2005/0053038 A1 | 3/2005 | Kimura | |
| 2008/0025236 A1 | 1/2008 | Jones | |
| 2008/0200203 A1 | 8/2008 | Malladi et al. | |
| 2008/0261530 A1 | 10/2008 | Gerstenberger et al. | |
| 2008/0280638 A1* | 11/2008 | Malladi | H04W 52/08 455/67.11 |
| 2009/0046645 A1 | 2/2009 | Bertrand et al. | |
| 2009/0103482 A1 | 4/2009 | Imamura et al. | |
| 2009/0176525 A1 | 7/2009 | Wang et al. | |
| 2009/0181712 A1 | 7/2009 | Xu | |
| 2009/0196229 A1 | 8/2009 | Shen et al. | |
| 2009/0197630 A1* | 8/2009 | Ahn | H04W 52/04 455/522 |
| 2009/0245194 A1* | 10/2009 | Damnjanovic | H04L 1/1607 370/329 |
| 2009/0286566 A1 | 11/2009 | Lindholm et al. | |
| 2010/0034163 A1 | 2/2010 | Damnjanovic et al. | |
| 2010/0113004 A1 | 5/2010 | Cave et al. | |
| 2010/0172313 A1 | 7/2010 | Ho et al. | |
| 2010/0226327 A1 | 9/2010 | Zhang et al. | |
| 2010/0254329 A1 | 10/2010 | Pan et al. | |
| 2011/0038271 A1 | 2/2011 | Shin et al. | |
| 2011/0038295 A1 | 2/2011 | Hu et al. | |
| 2011/0064042 A1 | 3/2011 | Kim et al. | |
| 2011/0182201 A1 | 7/2011 | Pajukoski et al. | |
| 2011/0243087 A1 | 10/2011 | Ahn et al. | |
| 2012/0044923 A1 | 2/2012 | Dateki | |
| 2012/0149427 A1 | 6/2012 | Perets et al. | |
| 2013/0034073 A1 | 2/2013 | Aiba et al. | |
| 2013/0077585 A1 | 3/2013 | Pan et al. | |
| 2013/0094483 A1 | 4/2013 | Marinier et al. | |
| 2014/0010193 A1 | 1/2014 | Papasakellariou et al. | |
| 2014/0119249 A1 | 5/2014 | Park | |
| 2014/0219221 A1 | 8/2014 | Dick et al. | |
| 2015/0043548 A1 | 2/2015 | Kang et al. | |
| 2015/0063267 A1 | 3/2015 | Ko et al. | |
| 2015/0215964 A1 | 7/2015 | Damnjanovic et al. | |
| 2015/0245337 A1 | 8/2015 | Park et al. | |
| 2016/0211962 A1 | 7/2016 | Lee et al. | |
| 2017/0230914 A1 | 8/2017 | Papasakellariou et al. | |
| 2019/0069250 A1 | 2/2019 | Dinan | |
| 2019/0200300 A1 | 6/2019 | Dinan | |
| 2019/0357240 A1 | 11/2019 | Kim et al. | |

OTHER PUBLICATIONS

NTT DOCOMO, "Modification on Number of OFDM symbols for Control part," R4-082207, Agenda item: 6.1.2.4, TSG-RAN Working Group 4 Meeting #48, Jeju, Korea, Aug. 18-22, 2008. (11 pages).

3GPP TS 36.211 V8.3.0, "$3^{rd}$ Generation Partnership Project; Technical Specification Group Radio Access Network; Evolved Universal Terrestrial Radio Access (E-UTRA); Physical Channels and Modulation (Release 8)," May 2008, 77 pages.

3GPP TS 36.212 V8.3.0, "$3^{rd}$ Generation Partnership Project; Technical Specification Group Radio Access Network; Evolved Universal Terrestrial Radio Access (E-UTRA); Multiplexing and channel coding (Release 8)," May 2008, 48 pages.

3GPP TS 36.213 V8.3.0, "$3^{rd}$ Generation Partnership Project; Technical Specification Group Radio Access Network; Evolved Universal Terrestrial Radio Access (E-UTRA); Physical layer procedures (Release 8)," May 2008, 46 pages.

Canadian Office Action, dated Dec. 30, 2015, for Canadian Application No. 2,755,352, 5 pages.

Extended European Search Report, dated Jun. 16, 2017, for European Application No. 10753283.0 - 1870, 7 pages.

International Search Report, mailed Apr. 13, 2010, for International Application No. PCT/JP2010/001848, 2 pages.

Ericsson, "Carrier aggregation in LTE-Advanced," R1-082468, Agenda Item: 12, TSG-RAN WG1 #53bis, Warsaw, Poland, Jun. 30-Jul. 4, 2008, 6 pages.

Huawei, "DL/UL Asymmetric Carrier aggregation," R1-083706, Agenda Item: 11, 3GPP TSG-RAN-WG1 Meeting #54bis, Prague, Czech Republic, Sep. 29-Oct. 3, 2008, 4 pages.

Huawei, "PUCCH design for carrier aggregation," R1-090813, Agenda Item: 12.1, 3GPP TSG RAN WG1 Meeting #56, Athens, Greece, Feb. 9-13, 2009, 6 pages.

Huawei, "PUCCH Resource Allocation for ACK/NACK Repetition," R1-082355, Agenda Item: 6.1, TSG-RAN WG1 Meeting #53b, Warsaw, Poland, Jun. 30-Jul. 4, 2008, 4 pages.

LG Electronics, "Uplink control channel transmission for LTE-Advanced," R1-090656, Agenda Item: 12.1, 3GPP TSG RAN WG1 #56, Athens, Greece, Feb. 9-13, 2009, 5 pages.

LG Electronics, "PUCCH ACK/NACK configuration and CCE index mapping," R1-081003, Agenda item: 6.1.4, 3GPP TSG RAN WG1 #52, Sorrento, Italy, Feb. 11-15, 2008, 4 pages.

LG Electronics, "Considerations on DL/UL Transmission in Asymmetric Carrier Aggregation," R1-090781, Agenda Item: 12.1, 3GPP TSG RAN WG1 Meeting #56, Athens, Greece, Feb. 9-13, 2009, 4 pages.

Motorola, "Control Signalling Design for Supporting Carrier Aggregation," R1-090792, Agenda Item: 12.1, 3GPP TSG RAN1 #56, Athens, Greece, Feb. 9-13, 2009, 8 pages.

Motorola, "PDCCH Uplink format," R1-073390, Agenda Item: 7.2.4, 3GPP TSG RAN1 #50, Athens, Greece, Aug. 20-24, 2007, 3 pages.

Panasonic, "PUCCH resource indication for carrier aggregation and SORTD," R1-101252, Agenda Item: 7.1.4 Pucch, 3GPP TSG RAN WG1 Meeting #60, San Francisco, USA, Feb. 22-26, 2010, 9 pages.

Panasonic, "Support of UL/DL asymmetric carrier aggregation," R1-082999, Agenda Item: 12 Study Item on LTE-Advanced, 3GPP TSG RAN WG1 Meeting #54, Jeju, Korea, Aug. 18-22, 2008, 3 pages.

TD Tech, "E-DCH power control clarification for 1.28Mcps TDD," R1-090667, Change Request, 3GPP TSG-RAN WG1 Meeting #56, Athens, Greece, Feb. 9-13, 2009, 2 pages.

\* cited by examiner

WIRELESS COMMUNICATION TERMINAL DEVICE, WIRELESS COMMUNICATION BASE STATION DEVICE, AND RESOURCE REGION SETTING METHOD

TECHNICAL FIELD

The present invention relates to a radio communication terminal apparatus, radio communication base station apparatus and resource area setting method.

BACKGROUND ART

3GPP-LTE (3rd Generation Partnership Project Radio Access Network Long Term Evolution, hereinafter referred to as "LTE") adopts OFDMA (Orthogonal Frequency Division Multiple Access) as a downlink communication scheme and adopts SC-FDMA (Single Carrier Frequency Division Multiple Access) as an uplink communication scheme (e.g. see non-patent literatures 1, 2 and 3).

According to LTE, a radio communication base station apparatus (hereinafter, abbreviated as "base station") performs communication by allocating resource blocks (RB's) in a system band to a radio communication terminal apparatus (hereinafter, abbreviated as "terminal") per time unit called "subframe." Furthermore, the base station transmits control information for notifying results of resource allocation of downlink data and uplink data to the terminal. This control information is transmitted to the terminal using a downlink control channel such as PDCCH (Physical Downlink Control Channel). Here, each PDCCH occupies a resource made up of one or a plurality of continuous CCEs (Control Channel Elements). LTE supports a frequency band having a width of maximum 20 MHz as a system bandwidth.

Furthermore, the PDCCH is transmitted within three initial OFDM symbols of each subframe. Furthermore, the number of OFDM symbols used to transmit PDCCHs can be controlled in subframe units and controlled with CFI (Control Format Indicator) information notified using a PCFICH (Physical Control Format Indicator Channel) transmitted using the first OFDM symbol of each subframe.

Furthermore, the base station simultaneously transmits a plurality of PDCCHs to allocate a plurality of terminals to one subframe. In this case, the base station includes CRC bits masked (or scrambled) with destination terminal IDs to identify the respective PDCCH destination terminals in the PDCCHs and transmits the PDCCHs. The terminal demasks (or descrambles) the CRC bits in a plurality of PDCCHs which may be directed to the terminal with the terminal ID of the terminal and thereby blind-decodes the PDCCHs and detects a PDCCH directed to the terminal.

Furthermore, studies are being carried out on a method of limiting CCEs to be subjected to blind decoding for each terminal for the purpose of reducing the number of times blind decoding is performed at the terminal. This method limits a CCE area to be subjected to blind decoding (hereinafter referred to as "search space") for each terminal. Thus, each terminal needs to perform blind decoding only on CCEs in the search space allocated to that terminal and can reduce the number of times to perform blind decoding. Here, the search space of each terminal is set using a hash function which is a function for performing randomization with the terminal ID of each terminal.

Furthermore, for the downlink data from the base station to the terminal, the terminal feeds back a response signal indicating the error detection result of the downlink data (hereinafter, referred to as "ACK/NACK signal") to the base station. The ACK/NACK signal is transmitted to the base station using an uplink control channel such as PUCCH (Physical Uplink Control Channel). Here, to eliminate the necessity for signaling to notify a PUCCH used to transmit the ACK/NACK signal from the base station to each terminal and efficiently use downlink communication resources, the CCE number to which the downlink data is assigned is associated with the resource number of the PUCCH that transmits the ACK/NACK signal corresponding to the downlink data. Each terminal can decide a PUCCH to use to transmit an ACK/NACK signal from the terminal from the CCE to which control information directed to the terminal is mapped. The ACK/NACK signal is a 1-bit signal indicating ACK (no error) or NACK (error present), and is BPSK-modulated and transmitted. Furthermore, the base station can freely set a resource area of the PUCCH to use to transmit the ACK/NACK signal and notifies the start resource number of the resource area of the PUCCH to all terminals located within the cell of the terminal using broadcast information.

Furthermore, transmission power used by the terminal for PUCCH transmission is controlled by a PUCCH transmission power control bit included in the PDCCH.

Furthermore, standardization of 3GPP LTE-Advanced (hereinafter referred to as "LTE-A") has been started which realizes further speed enhancement of communication compared to LTE. LTE-A is expected to introduce base stations and terminals (hereinafter referred to as "LTE-A terminals") capable of communicating at a wideband frequency of 40 MHz or above to realize a maximum downlink transmission rate of 1 Gbps or above and a maximum uplink transmission rate of 500 Mbps or above. Furthermore, the LTE-A system is required to accommodate not only LTE-A terminals but also terminals supporting the LTE system (hereinafter referred to as "LTE terminals").

LTE-A proposes a band aggregation scheme whereby communication is performed by aggregating a plurality of frequency bands to realize communication in a wideband of 40 MHz or above (e.g. see non-patent literature 1). For example, a frequency band having a bandwidth of 20 MHz is assumed to be a basic unit (hereinafter referred to as "component band"). Therefore, LTE-A realizes a system bandwidth of 40 MHz by aggregating two component bands.

Furthermore, according to LTE-A, the base station may notify resource allocation information of each component band to the terminal using a downlink component band of each component band (e.g. non-patent literature 4). For example, a terminal carrying out wideband transmission of 40 MHz (terminal using two component bands) obtains resource allocation information of two component bands by receiving a PDCCH arranged in the downlink component band of each component band.

Furthermore, according to LTE-A, the amounts of data transmission on an uplink and downlink are assumed to be independent of each other. For example, there may be a case where wideband transmission (communication band of 40 MHz) is performed on a downlink and narrowband transmission (communication band of 20 MHz) is performed on an uplink. In this case, the terminal uses two downlink component bands on the downlink and uses only one uplink component band on the uplink. That is, asymmetric component bands are used for the uplink and downlink (e.g. see non-patent literature 5). In this case, both ACK/NACK signals corresponding to downlink data transmitted with the two downlink component bands are transmitted to the base station using ACK/NACK resources arranged on a PUCCH of one uplink component band.

Furthermore, also when the same number of component bands are used for an uplink and downlink, as in the case of using asymmetric component bands as described above, studies are also being carried out on a possibility that a plurality of ACK/NACK signals corresponding to downlink data transmitted in a plurality of downlink component bands may be transmitted from one uplink component band. Here, it is independently set per terminal from which uplink component band of the plurality of uplink component bands an ACK/NACK signal is transmitted.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008
NPL 4
3GPP TSG RAN WG1 meeting, R1-082468, "Carrier aggregation LTE-Advanced," Jul. 2008
NPL 5
3GPP TSG RAN WG1 meeting, R1-083706, "DL/UL Asymmetric Carrier aggregation," Sep. 2008

SUMMARY OF INVENTION

Technical Problem

When a plurality of ACK/NACK signals corresponding to downlink data transmitted with a plurality of downlink component bands are transmitted from one uplink component band, it is necessary to prevent the ACK/NACK signals corresponding to the downlink data transmitted in each downlink component band from colliding with each other. That is, in each uplink component band, it is necessary to set a PUCCH resource area for transmission of an ACK/NACK signal (hereinafter referred to as "PUCCH area") for each of all downlink component bands.

Here, for a PUCCH area corresponding to each downlink component band set in each uplink component band, it is necessary to secure a resource area enough to accommodate an ACK/NACK signal corresponding to downlink data transmitted from each downlink component band. This is because ACK/NACK resources are associated with CCEs in a one-to-one correspondence. For this reason, as the number of downlink component bands increases, the number of PUCCH areas (number of ACK/NACK resources) that needs to be secured for each uplink component band increases, and uplink resources to which uplink data of the terminal is allocated (e.g. PUSCH (Physical Uplink Shared Channel)) fall short. This may lead to a decrease in uplink data throughput.

Furthermore, the base station notifies a PUCCH area corresponding to each downlink component band using broadcast information. Here, since the above PUCCH area needs to be set in a plurality of uplink component bands, the base station notifies the PUCCH area of each downlink component band using broadcast information of the downlink component band associated (paired) with each uplink component band. That is, information on the PUCCH areas for all downlink component bands (broadcast information) needs to be notified to each uplink component band. For this reason, the increase in overhead of downlink broadcast information leads to a decrease in downlink data throughput.

It is therefore an object of the present invention to provide a terminal, base station and resource area setting method capable of reducing PUCCH areas (number of ACK/NACK resources) in an uplink component band without increasing signaling even when a plurality of ACK/NACK signals directed to downlink data transmitted in a plurality of downlink component bands are transmitted from one uplink component band.

Solution to Problem

A terminal according to the present invention is a radio communication terminal apparatus that performs communication using a plurality of downlink component bands, and adopts a configuration including a receiving section that obtains CFI information indicating the number of symbols used for a control channel to which resource allocation information of downlink data directed to the radio communication terminal apparatus is allocated for each of the plurality of downlink component bands, a setting section that sets, in the uplink component band set in the terminal apparatus, a resource area to which a response signal corresponding to the downlink data for each of the plurality of downlink component bands based on the CFI information for each of the plurality of downlink component bands and a mapping section that maps the response signal to the resource area corresponding to the downlink component band used to allocate the downlink data.

A base station according to the present invention adopts a configuration for a radio communication terminal apparatus that performs communication using a plurality of downlink component bands, including a generating section that generates CFI information indicating the number of symbols used for a control channel to which resource allocation information of downlink data directed to the radio communication terminal apparatus is allocated for each of the plurality of downlink component bands and a receiving section that identifies a resource area to which a response signal corresponding to the downlink data is allocated based on the CFI information for each of the plurality of downlink component bands in an uplink component band set in the radio communication terminal apparatus and extracts the response signal from the resource area corresponding to the downlink component band used to allocate the downlink data.

A resource area setting method according to the present invention is a method for a radio communication terminal apparatus that performs communication using a plurality of downlink component bands, obtaining CFI information indicating the number of symbols used for a control channel to which resource allocation information of downlink data directed to the radio communication terminal apparatus is allocated for each of the plurality of downlink component bands and setting, in an uplink component band set in the radio communication terminal apparatus, a resource area to which a response signal corresponding to the downlink data is allocated for each of the plurality of downlink component bands based on the CFI information for each of the plurality of downlink component bands.

Advantageous Effects of Invention

According to the present invention, even when a plurality of ACK/NACK signals corresponding to downlink data transmitted in each of a plurality of downlink component bands are transmitted from one uplink component band, it is possible to reduce the PUCCH areas (number of ACK/NACK resources) in an uplink component band without increasing signaling.

DESCRIPTION OF EMBODIMENTS

Figure 1:
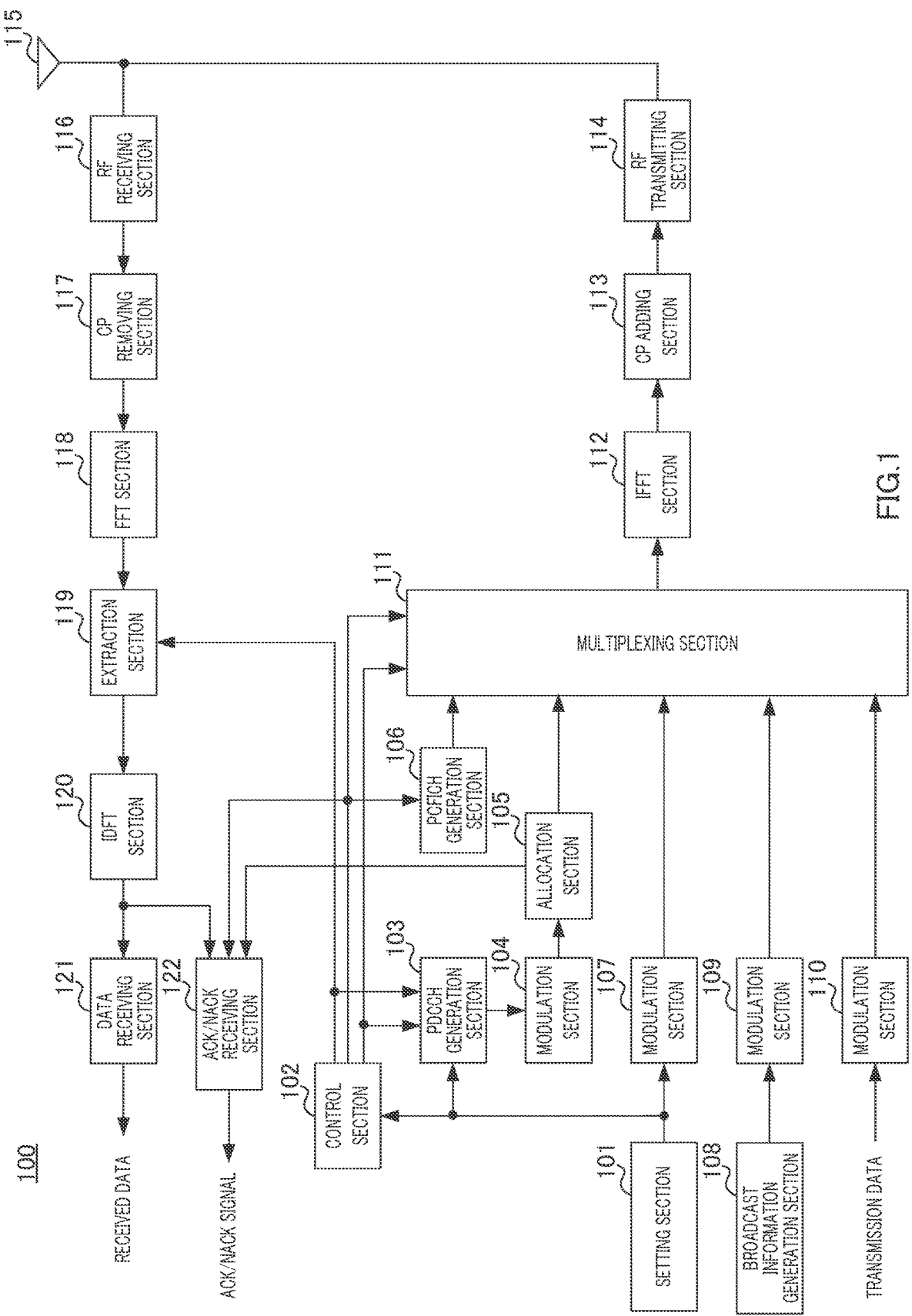
FIG. 1 is a block diagram illustrating a configuration of a base station according to Embodiment 1 of the present invention.

Hereinafter, embodiments of the present invention will be described in detail with reference to the accompanying drawings. In the following embodiments, the same components will be assigned the same reference numerals and overlapping explanations will be omitted.

The following descriptions assume a system whose downlink and uplink are made up of two component bands respectively. Furthermore, a base station allocates downlink data using PDCCHs arranged in two downlink component bands and transmits the downlink data to a terminal. Furthermore, the terminal feeds back an ACK/NACK signal corresponding to the downlink data transmitted using the two downlink component bands to the base station using a PUCCH arranged in one uplink component band.

Embodiment 1

FIG. 1 is a block diagram illustrating a configuration of base station 100 according to the present embodiment.

In base station 100 shown in FIG. 1, setting section 101 sets (configures) one or a plurality of component bands to use for an uplink and a downlink per terminal according to a required transmission rate and amount of data transmission or the like. For example, setting section 101 sets an uplink component band and a downlink component band to use for data transmission and an uplink component band to use for PUCCH transmission. Setting section 101 then outputs setting information including the component band set in each terminal to control section 102, PDCCH generation section 103 and modulation section 107.

Control section 102 generates uplink resource allocation information indicating uplink resources (e.g. PUSCH) to which uplink data of a terminal is allocated and downlink resource allocation information indicating downlink resources (e.g. PDSCH (Physical Downlink Shared Channel)) to which downlink data directed to the terminal is allocated. Control section 102 then outputs the uplink resource allocation information to PDCCH generation section 103 and extraction section 119 and outputs the downlink resource allocation information to PDCCH generation section 103 and multiplexing section 111. Here, control section 102 allocates uplink resource allocation information and downlink resource allocation information to PDCCHs arranged in downlink component bands set in each terminal based on the setting information inputted from setting section 101. To be more specific, control section 102 allocates the downlink resource allocation information to PDCCHs arranged in the downlink component bands to be subjected to resource allocation indicated in the downlink resource allocation information. Furthermore, control section 102 allocates uplink resource allocation information to PDCCHs arranged in downlink component bands associated with the uplink component bands to be subjected to resource allocation indicated in the uplink allocation information. A PDCCH is made up of one or a plurality of CCEs. Furthermore, the number of CCEs used by base station 100 is set based on propagation path quality (CQI: Channel Quality Indicator) of the allocation target terminal are and a control information size so that the terminal can receive control information at a necessary and sufficient error rate. Furthermore, control section 102 determines, for each component band, the number of OFDM symbols to use for transmission of PDCCHs based on the number of CCEs to use for PDCCHs to which control information (e.g. allocation information) is allocated in each downlink component and generates CFI information indicating the determined number of OFDM symbols. That is, control section 102 generates, for each of the plurality of downlink component bands, CFI information indicating the number of OFDM symbols to use for a PDCCH to which resource allocation information (uplink resource allocation information or downlink resource allocation information) of downlink data directed to the terminal is allocated for the terminal that communicates using a plurality of downlink component bands. Control section 102 then outputs CFI information per downlink component band to PCFICH generation section 106, multiplexing section 111 and ACK/NACK receiving section 122.

PDCCH generation section 103 generates a PDCCH signal including the uplink resource allocation information and downlink resource allocation information inputted from control section 102. Furthermore, PDCCH generation section 103 adds a CRC bit to the PDCCH signal to which the uplink resource allocation information and downlink resource allocation information have been allocated and further masks (or scrambles) the CRC bit with the terminal ID. PDCCH generation section 103 then outputs the masked PDCCH signal to modulation section 104.

Modulation section 104 modulates the PDCCH signal inputted from PDCCH generation section 103 after channel coding and outputs the modulated PDCCH signal to allocation section 105.

Allocation section 105 allocates the PDCCH signal of each terminal inputted from modulation section 104 to a CCE in a search space per terminal in a downlink component band in each component band. For example, allocation section 105 calculates a search space of each of the plurality of downlink component bands set in each terminal from the terminal ID of each terminal, CCE number calculated using a hash function for performing randomization and the number of CCEs (L) making up the search space. That is, allocation section 105 sets the CCE number calculated using the terminal ID of a certain terminal and a hash function at the starting position (CCE number) of the search space of the terminal and sets consecutive CCEs corresponding to the number of CCEs L from the starting position as the search space of the terminal. Here, allocation section 105 sets the same search space (search space made up of CCEs of the same CCE number) between a plurality of downlink component bands set per terminal. Allocation section 105 then outputs the PDCCH signal allocated to the CCE to multiplexing section 111. Furthermore, allocation section 105 outputs the CCE number of the CCE to which the PDCCH signal has been allocated to ACK/NACK receiving section 122.

PCFICH generation section 106 generates a PCFICH signal based on CFI information per downlink component band inputted from control section 102. For example, PCFICH generation section 106 generates information of 32 bits by coding CFI information (CFI bits) of 2 bits of each downlink component band, QPSK-modulates the generated information of 32 bits and thereby generates a PCFICH signal. PCFICH generation section 106 then outputs the generated PCFICH signal to multiplexing section 111.

Modulation section 107 modulates the setting information inputted from setting section 101, and outputs the modulated setting information to multiplexing section 111.

Broadcast information generation section 108 sets operation parameters (system information (SIB: System Information Block)) of the cell of the base station and generates broadcast information including the set system information (SIB). Here, base station 100 broadcasts system information of each uplink component band using a downlink component band associated with the uplink component band. Examples of the system information of the uplink component band include PUCCH area information indicating the starting position (resource number) of the PUCCH area to use for transmission of an ACK/NACK signal. Broadcast information generation section 108 then outputs the broadcast information including the system information (SIB) of the cell of the base station including the PUCCH area information or the like to modulation section 109.

Modulation section 109 modulates the broadcast information inputted from broadcast information generation section 108 and outputs the modulated broadcast information to multiplexing section 111.

Modulation section 110 modulates inputted transmission data (downlink data) after channel coding and outputs the modulated transmission data signal to multiplexing section 111.

Multiplexing section 111 multiplexes the PDCCH signal inputted from allocation section 105, PCFICH signal inputted from PCFICH generation section 106, setting information inputted from modulation section 107, broadcast information inputted from modulation section 109 and data signal (that is, PDSCH signal) inputted from modulation section 110. Here, multiplexing section 111 determines the number of OFDM symbols in which PDCCHs are arranged for each downlink component band based on the CFI information inputted from control section 102. Furthermore, multiplexing section 111 maps the PDCCH signal and data signal (PDSCH signal) to each downlink component band based on the downlink resource allocation information inputted from control section 102. Multiplexing section 111 may also map the setting information to a PDSCH. Multiplexing section 111 then outputs the multiplexed signal to IFFT (Inverse Fast Fourier Transform) section 112.

IFFT section 112 transforms the multiplexed signal inputted from multiplexing section 111 into a time waveform and CP (Cyclic Prefix) adding section 110 adds a CP to the time waveform and thereby obtains an OFDM signal.

RF transmitting section 114 applies radio transmission processing (up-conversion, D/A conversion or the like) to the OFDM signal inputted from CP adding section 113 and transmits the OFDM signal via antenna 115.

On the other hand, RF receiving section 116 applies radio receiving processing (down-conversion, A/D conversion or the like) to a received radio signal received in a reception band via antenna 115 and outputs the received signal obtained to CP removing section 117.

CP removing section 114 removes a CP from the received signal and FFT (Fast Fourier Transform) section 115 transforms the received signal after the CP removal into a frequency domain signal.

Extraction section 119 extracts uplink data of each terminal and PUCCH signal (e.g. ACK/NACK signal) from the frequency domain signal inputted from FFT section 118 based on the uplink resource allocation information (e.g. uplink resource allocation information 4 subframes ahead) inputted from control section 102. IDFT (Inverse Discrete Fourier transform) section 120 transforms the signal extracted by extraction section 119 into a time domain signal and outputs the time domain signal to data receiving section 121 and ACK/NACK receiving section 122.

Data receiving section 121 decodes uplink data out of the time domain signal inputted from IDFT section 120. Data receiving section 121 outputs the decoded uplink data as received data.

ACK/NACK receiving section 122 extracts an ACK/NACK signal from each terminal corresponding to the downlink data (PDSCH signal) out of the time domain signal inputted from IDFT section 120. To be more specific, ACK/NACK receiving section 122 extracts, in an uplink component band set in each terminal, an ACK/NACK signal from a PUCCH (ACK/NACK resource) associated with a CCE used for the PDCCH signal out of the PUCCH area corresponding to the downlink component band in which the PDCCH signal used to allocate the downlink data is arranged. Here, the PUCCH area is identified from the number of CCEs available in each downlink component band inputted from control section 102 and calculated from the CFI information of each downlink component band, and a downlink component band number. Here, if base station 100 allocates a PDCCH signal including downlink resource allocation information of downlink data (PDSCH signal) of a plurality of component bands to CCEs of a plurality of downlink component bands for a certain terminal, ACK/NACK receiving section 122 extracts an ACK/NACK signal from the PUCCH (ACK/NACK resource) associated with the CCE number of the CCE used to allocate the downlink data in the PUCCH areas corresponding to the respective downlink component bands. To be more specific, ACK/NACK receiving section 122 identifies a PUCCH area to which an ACK/NACK signal corresponding to downlink data is allocated based on the number of CCEs available for each of a plurality of downlink component bands calculated based on the CFI information for each of the plurality of downlink component bands set in the terminal in the uplink component band set in the terminal. ACK/NACK receiving section 122 then extracts the ACK/NACK signal from the PUCCH area corresponding to the downlink component band used to allocate the downlink data. Thus, ACK/NACK receiving section 122 obtains each ACK/NACK signal corresponding to downlink data of a plurality of component bands. ACK/NACK receiving section 122 then makes an ACK/NACK decision on the extracted ACK/NACK signal.

Figure 2:
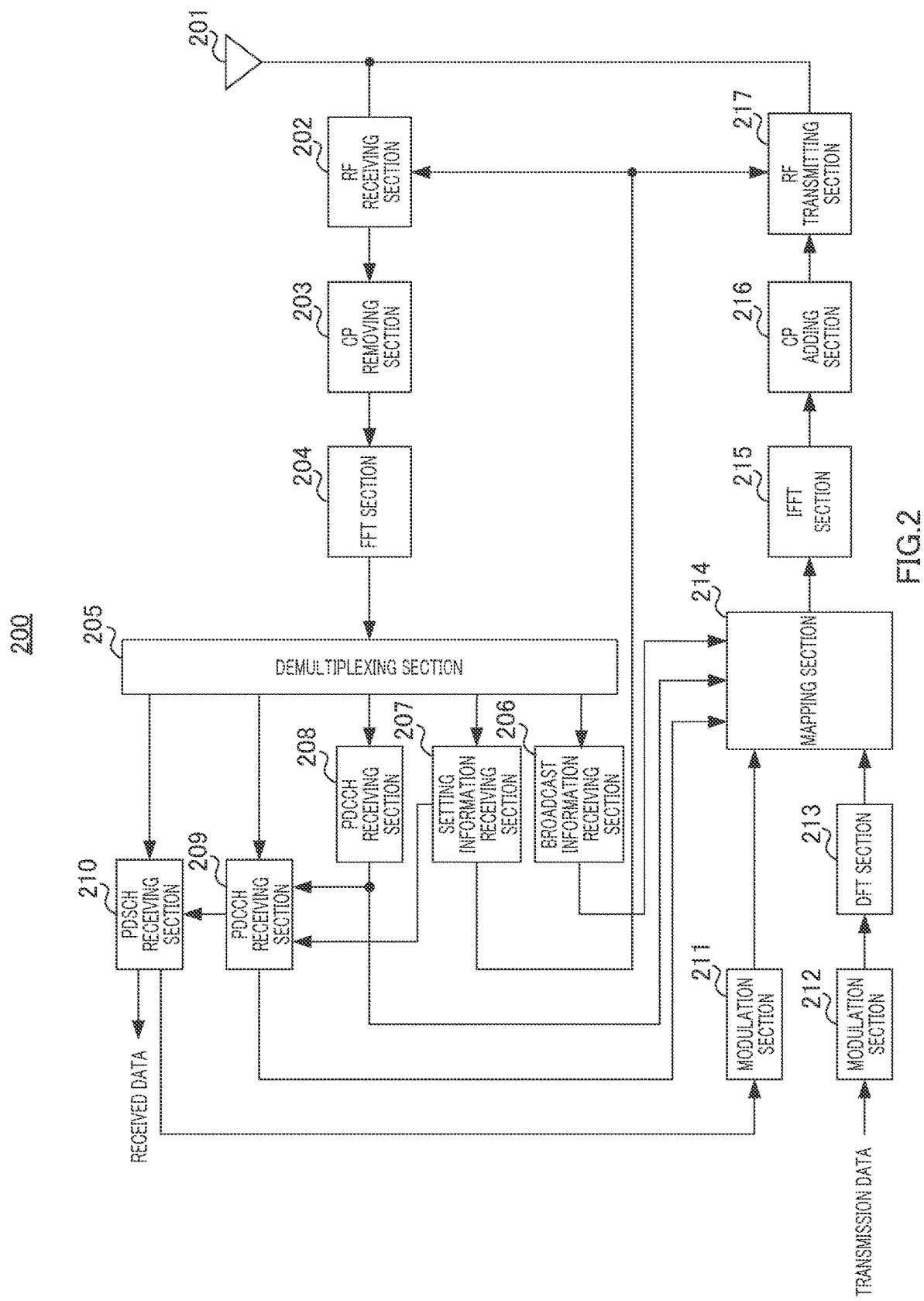
FIG. 2 is a block diagram illustrating a configuration of a terminal according to Embodiment 1 of the present invention.

FIG. 2 is a block diagram illustrating a configuration of terminal 200 according to the present embodiment. Terminal 200 receives a data signal (downlink data) using a plurality of downlink component bands and transmits an ACK/NACK signal for the data signal to base station 100 using a PUCCH of one uplink component band.

In terminal 200 shown in FIG. 2, RF receiving section 202 is configured to be able to change a reception band and changes the reception band based on band information inputted from setting information receiving section 207. RF receiving section 202 then applies radio receiving processing (down-conversion, A/D conversion or the like) to the received radio signal (here, OFDM signal) received in the reception band via antenna 201 and outputs the received signal obtained to CP removing section 203.

CP removing section 203 removes a CP from the received signal and FFT section 204 transforms the received signal after the CP removal into a frequency domain signal. The frequency domain signal is outputted to demultiplexing section 205.

Demultiplexing section 205 demultiplexes the signal inputted from FFT section 204 into broadcast information including system information per cell including PUCCH area information indicating the PUCCH area, a control signal (e.g. RRC signaling) of a higher layer including setting information, a PCFICH signal, a PDCCH signal and a data signal (that is, PDSCH signal). Demultiplexing section 205 then outputs the broadcast information to broadcast information receiving section 206, outputs the control signal to setting information receiving section 207, outputs the PCFICH signal to PCFICH receiving section 208, outputs the PDCCH signal to PDCCH receiving section 209 and outputs the PDSCH signal to PDSCH receiving section 210.

Broadcast information receiving section 206 reads system information (SIB) from the broadcast information inputted from demultiplexing section 205. Furthermore, broadcast information receiving section 206 outputs PUCCH area information included in the system information of the downlink component band associated with the uplink component band to use for PUCCH transmission to mapping section 214. Here, the PUCCH area information includes the starting position (resource number) of the PUCCH area of the uplink component band and is broadcast, for example, with SIB2 (system information block type 2).

Setting information receiving section 207 reads the uplink component band and downlink component band to use for data transmission set in the terminal and information indicating the uplink component band to use for PUCCH transmission from the control signal inputted from demultiplexing section 205. Setting information receiving section 207 then outputs the read information to PDCCH receiving section 209, RF receiving section 202 and RF transmitting section 217 as band information. Furthermore, setting information receiving section 207 reads information indicating the terminal ID set in the terminal from the control signal inputted from demultiplexing section 205 and outputs the read information to PDCCH receiving section 209 as terminal ID information.

PCFICH receiving section 208 extracts CFI information from the PCFICH signal inputted from demultiplexing section 205. That is, PCFICH receiving section 208 obtains the CFI information indicating the number of OFDM symbols to use for a PDCCH to which resource allocation information of downlink data directed to the terminal is allocated for each of the plurality of downlink component bands set in the terminal. PCFICH receiving section 208 then outputs the extracted CFI information to PDCCH receiving section 209 and mapping section 214.

PDCCH receiving section 209 blind-decodes the PDCCH signal inputted from demultiplexing section 205 and obtains a PDCCH signal (resource allocation information) directed to the terminal. Here, the PDCCH signal is allocated to each CCE (that is, PDCCH) arranged in the downlink component band set in the terminal indicated in the band information inputted from setting information receiving section 207. To be more specific, PDCCH receiving section 209 identifies the number of OFDM symbols in which the PDCCH is arranged for each downlink component band based on the CFI information inputted from PCFICH receiving section 208. PDCCH receiving section 209 then calculates a search space of the terminal using the terminal ID of the terminal indicated in the terminal ID information inputted from setting information receiving section 207. All search spaces (CCE numbers of CCEs constituting the search space) calculated here are the same between a plurality of downlink component bands set in the terminal. PDCCH receiving section 209 then demodulates and decodes the PDCCH signal allocated to each CCE in the calculated search space. PDCCH receiving section 209 demasks a CRC bit with the terminal ID of the terminal indicated in the terminal ID information for the decoded PDCCH signal and thereby decides the PDCCH signal which results in CRC=OK (no error) to be a PDCCH signal directed to the terminal. PDCCH receiving section 209 performs the above-described blind decoding on each component band to which a PDCCH signal has been transmitted and thereby acquires resource allocation information of the component band. PDCCH receiving section 209 outputs downlink resource allocation information included in the PDCCH signal directed to the terminal to PDSCH receiving section 210 and outputs uplink resource allocation information to mapping section 214. Furthermore, PDCCH receiving section 209 outputs the CCE number of the CCE (CCE resulting in CRC=OK) from which the PDCCH signal directed to the terminal is detected in each component band to mapping section 214. When a plurality of CCEs are used for one PDCCH signal, PDCCH receiving section 209 outputs the start (smallest number) CCE number to mapping section 214.

PDSCH receiving section 210 extracts received data (downlink data) from the PDSCH signals of a plurality of downlink component bands inputted from demultiplexing section 205 based on the downlink resource allocation information of the plurality of downlink component bands inputted from PDCCH receiving section 209. Furthermore, PDSCH receiving section 210 performs error detection on the extracted received data (downlink data). When the error detection result shows that an error is found in the received data, PDSCH receiving section 210 generates a NACK signal as the ACK/NACK signal, whereas when no error is found in the received data, PDSCH receiving section 210 generates an ACK signal as the ACK/NACK signal and outputs the ACK/NACK signal to modulation section 211. When base station 100 transmits two data blocks (Transport Blocks) by spatially multiplexing PDSCH transmission through MIMO (Multiple-Input Multiple-Output) or the like, PDSCH receiving section 210 generates ACK/NACK signals for the respective data blocks.

Modulation section 211 modulates the ACK/NACK signal inputted from PDSCH receiving section 210. When base station 100 transmits two data blocks by spatially multiplexing the PDSCH signal in each downlink component band, modulation section 211 applies QPSK modulation to the ACK/NACK signal. On the other hand, when base station 100 transmits one data block, modulation section 211 applies BPSK modulation to the ACK/NACK signal. That is, modulation section 211 generates one QPSK signal or BPSK signal as the ACK/NACK signal per downlink component band. Modulation section 211 then outputs the modulated ACK/NACK signal to mapping section 214.

Modulation section 212 modulates transmission data (uplink data) and outputs the modulated data signal to DFT (Discrete Fourier transform) section 213.

DFT section 213 transforms the data signal inputted from modulation section 212 into a frequency domain signal and outputs the plurality of frequency components obtained to mapping section 214.

Mapping section 214 maps the data signal inputted from DFT section 213 to PUSCHs arranged in the uplink component band according to the uplink resource allocation information inputted from PDCCH receiving section 209. Furthermore, mapping section 214 maps the ACK/NACK signal inputted from modulation section 211 to the PUCCHs arranged in the uplink component band according to the PUCCH area information (information indicating the starting position of the PUCCH area) inputted from broadcast information receiving section 206, CFI information per downlink component band inputted from PCFICH receiving section 208 and the CCE number inputted from inputted from PDCCH receiving section 209. That is, mapping section 214 sets, in the uplink component band set in the terminal, the PUCCH area to which the ACK/NACK signal is allocated for every plurality of downlink component bands based on the number of CCEs available for every plurality of downlink component bands calculated based on the CFI information for every plurality of downlink component bands set in the terminal. Mapping section 214 then maps the ACK/NACK signal to the PUCCH area corresponding to the downlink component band used to allocate the downlink data (that is, ACK/NACK resources associated with the CCE of the CCE number inputted from PDCCH receiving section 209).

Figure 3:
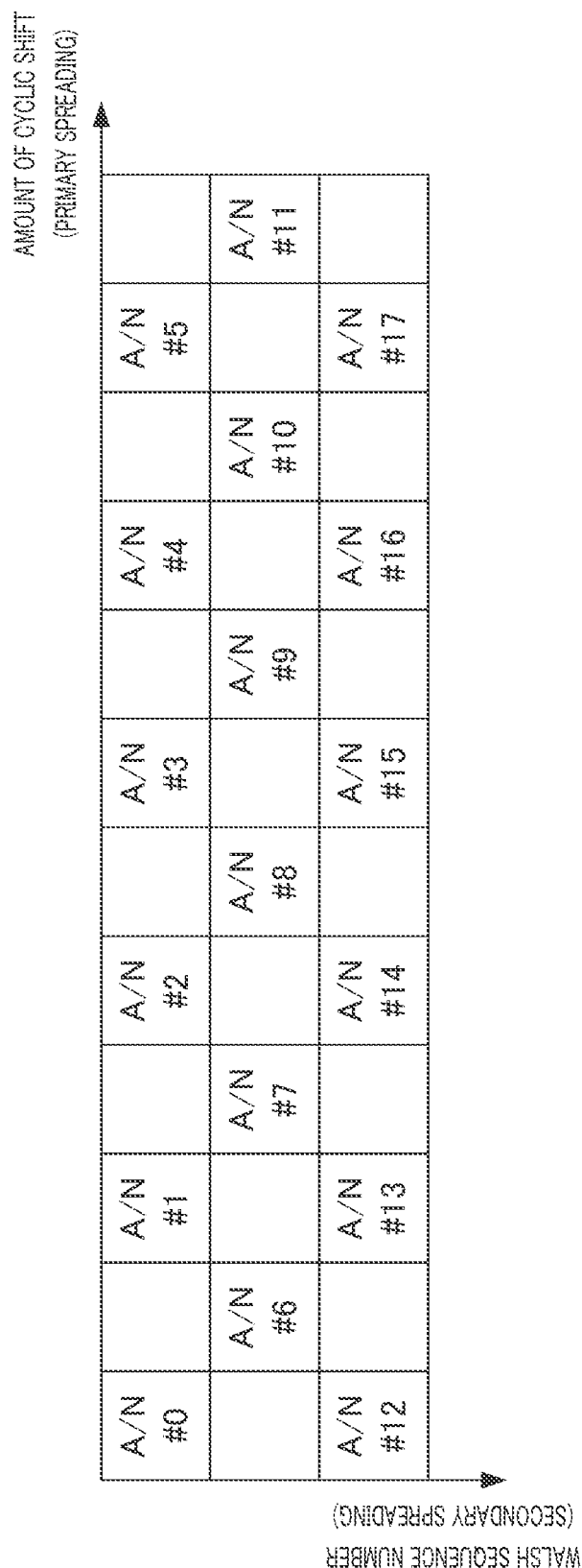
FIG. 3 is a diagram illustrating PUCCH resources associated with each CCE according to Embodiment 1 of the present invention.

For example, as shown in FIG. 3, ACK/NACK resources (A/Ns #0 to #17) of the PUCCH are defined by a primary spreading sequence (amount of cyclic shift of ZAC (Zero Auto Correlation) sequence) and a secondary spreading sequence (blockwise spreading code such as Walsh sequence). Here, ACK/NACK resource numbers are associated with CCE numbers in a one-to-one correspondence and mapping section 214 allocates ACK/NACK signals to the primary spreading sequence and secondary spreading sequence associated with the CCE number inputted from PDCCH receiving section 209. Furthermore, when a PDSCH signal is transmitted in a plurality of downlink component bands, mapping section 214 allocates ACK/NACK signals corresponding to the PDSCH signals transmitted in the respective downlink component bands to ACK/NACK resources associated with the CCEs used to allocate the PDSCH signal out of the PUCCH area corresponding to the downlink component band in which the PDCCH used to allocate the PDSCH signal is arranged.

Modulation section 211, modulation section 212, DFT section 213 and mapping section 214 may be provided for each component band.

IFFT section 215 transforms a plurality of frequency components mapped to the PUSCH into a time domain waveform, and CP adding section 216 adds a CP to the time domain waveform.

RF transmitting section 217 is configured to be able to change a transmission band and sets a transmission band based on the band information inputted from setting information receiving section 207. RF transmitting section 217 then applies radio transmission processing (up-conversion, D/A conversion or the like) to the signal with a CP added and transmits the signal via antenna 201.

Next, details of operations of base station 100 and terminal 200 will be described.

Figure 4:
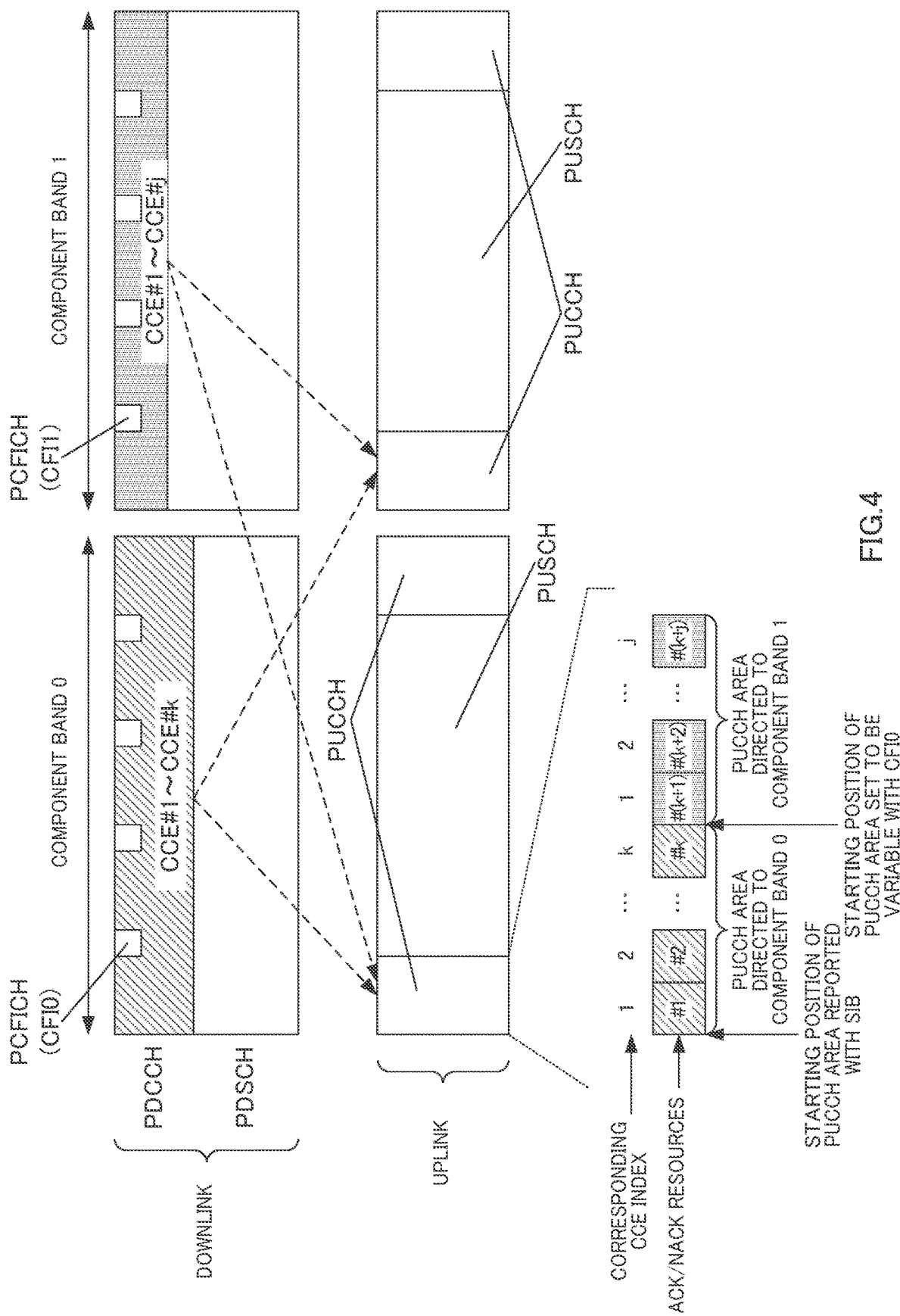
FIG. 4 is a diagram illustrating settings of PUCCH areas according to Embodiment 1 of the present invention.

In the following descriptions, setting section 101 of base station 100 (FIG. 1) sets, in terminal 200, two downlink component bands (component band 0 and component band 1) and one uplink component band (component band 0) of the system in which a downlink and an uplink shown in FIG. 4 are each made up of two component bands. Therefore, terminal 200 transmits an ACK/NACK signal to base station 100 using the resource areas (ACK/NACK resources) of the PUCCHs arranged in the uplink component band of component band 0 associated with the CCE used to allocate a PDSCH signal irrespective of in which downlink component band the PDSCH signal has been received. In FIG. 4, the PUCCH areas are set at both ends of the uplink component band and one PUCCH is hopping-transmitted in the first-half and second-half portions of one subframe. Therefore, only one area will be described as the PUCCH area below.

Furthermore, the PDCCH arranged in each downlink component band shown in FIG. 4 is made up of a plurality of CCEs (CCE #1, CCE #2, CCE #3 . . . ). Furthermore, each ACK/NACK resource such as ACK/NACK resource #1 to #(k+j) shown in FIG. 4 corresponds, for example, to ACK/NACK resource (A/N #0 to #17) shown in FIG. 3. Each ACK/NACK resource (A/N #0 to #17) shown in FIG. 3 represents an ACK/NACK resource corresponding to one RB and a plurality of RBs are used to provide 18 or more ACK/NACK resources. Furthermore, when a plurality of RBs are used, ACK/NACK resource numbers are sequentially numbered from RBs at both ends of the band toward the center.

Furthermore, as shown in FIG. 4, of the CFI information allocated to PCFICH resources of each downlink component band, suppose the CFI information indicating the number of OFDM symbols in which a PDCCH is arranged in the downlink component band of component band 0 is CFI0 and the CFI information indicating the number of OFDM symbols in which a PDCCH is arranged in the downlink component band of component band 1 is CFI1. CFI0 and CFI1 take one of values 1 to 3 (that is, 1 to 3 OFDM symbols). Here, as shown in FIG. 4, control section 102 of base station 100 assumes the number of CCEs available in the downlink component band of component band 0 is k (CCEs #1 to #k) and CFI0 in component band 0 is L. Furthermore, control section 102 assumes the number of CCEs available in the downlink component band of component band 1 is j (CCEs #1 to #j).

Allocation section 105 of base station 100 (FIG. 1) allocates a PDCCH signal of each downlink component band to one of CCEs #1 to #k of the downlink component band of component band 0 and CCEs #1 to #j of the downlink component band of component band 1 set in terminal 200.

Furthermore, broadcast information generation section 108 of base station 100 generates system information indicating the starting position (resource number) of the PUCCH area of the uplink component band of component band 0 associated with the downlink component band of component band 0. Furthermore, broadcast information generation section 108 generates system information indicating the starting position (resource number) of the PUCCH area of the uplink component band of component band 1 associated with the downlink component band of component band 1. For example, the system information is included in SIB2.

Broadcast information receiving section 206 of terminal 200 reads the starting position (resource number) of the PUCCH area in the uplink component band associated with each downlink component band included in the system information (SIB2) of component band 0 and component band 1 shown in FIG. 4. That is, broadcast information receiving section 206 reads the starting position of the PUCCH area in the uplink component band of component band 0 from SIB2 (not shown) of the downlink component band of component band 0 shown in FIG. 4 and reads the starting position of the PUCCH area in the uplink component band of component band 1 from SIB2 (not shown) of the downlink component band of component band 1 shown in FIG. 4.

Furthermore, PCFICH receiving section 208 extracts CFI0 (=L) from the PCFICH signal allocated to the PCFICH resource of component band 0 shown in FIG. 4 and extracts CFI1 from the PCFICH signal allocated to the PCFICH resource of component band 1.

PDCCH receiving section 209 then identifies the number of OFDM symbols in which PDCCHs are arranged in the downlink component band of component band 0 based on CFI0 and identifies the number of OFDM symbols in which PDCCHs are arranged in the downlink component band of component band 1 based on CFI1. PDCCH receiving section 209 then blind-decodes the CCEs in search spaces (not shown) of component band 0 and component band 1 and identifies the CCEs to which the PDCCH signal (resource allocation information) directed to the terminal is allocated. Here, there may be a plurality of CCEs to which the PDCCH signal (resource allocation information) directed to the terminal is allocated. Thus, as shown in FIG. 4, PDCCH receiving section 209 decides PDCCH signals allocated to one or a plurality of CCEs of CCEs #1 to #k of the downlink component band of component band 0 and PDCCH signals allocated to one or a plurality of CCEs of CCEs #1 to #j of the downlink component band of component band 1 as PDCCH signals directed to the terminal.

Furthermore, mapping section 214 maps ACK/NACK signals corresponding to the downlink data allocated using one or a plurality of CCEs of CCEs #1 to #k of component band 0 in the uplink component band of component band 0 shown in FIG. 4 and ACK/NACK signals corresponding to the downlink data allocated using one or a plurality of CCEs of CCEs #1 to #j of component band 1 to the PUCCH area corresponding to the downlink component band used to allocate each piece of downlink data.

Here, the PUCCH areas (ACK/NACK resources) to use for transmission of ACK/NACK signals for the downlink data allocated using CCEs of each downlink component band are calculated according to the number of CCEs available in each downlink component band calculated based on the CFI information (here, CFI0 and CFI1) and the CCE number of the CCE used to allocate the downlink data (start CCE number when a plurality of CCEs are used). To be more specific, the number of CCEs $N_{CCE}(i)$ available in a downlink component band of component band i in a certain subframe is calculated according to following equation 1.

[1]

$$N_{CCE}(i)=(L(i)*N_{RE\_total}-N_{RS}-N_{PCFICH}-N_{PHICH})/N_{RE\_CCE} \quad \text{(Equation 1)}$$

Here, i represents a component band number (i=0, 1 in FIG. 4) of a component band. Furthermore, L(i) represents CFI information (here, L(i)=1 to 3) of a downlink component band (component band i) in a certain subframe, $N_{RE\_total}$ represents the number of REs (Resource Elements) included in 1 OFDM symbol, $N_{RS}$ represents the number of REs used for reference signals included in L(i) OFDM symbols, $N_{PCFICH}$ represents the number of REs used for the PCFICH signal included in L(i) OFDM symbols, $N_{PHICH}$ represents the number of REs used for the PHICH (Physical Hybrid-ARQ Indicator Channel) signal (downlink ACK/NACK signal) included in L(i) OFDM symbols and $N_{RE\_CCE}$ represents the number of REs per CCE. For example, according to LTE, $N_{PCFICH}$=16 and $N_{RE\_CCE}$=36. Furthermore, $N_{RS}$ depends on the number of antenna ports and can be calculated by terminal 200. Furthermore, $N_{PHICH}$ can be calculated by terminal 200 from PHICH information notified with broadcast information. Furthermore, terminal 200 uses, for example, a value 4 subframes ahead of the transmission timing of an ACK/NACK signal as L(i). This is because the terminal performs decoding processing or the like on the received PDCCH signal and PDSCH signal and then transmits an ACK/NACK signal 4 subframes later. Furthermore, an RE is a resource unit representing 1 sub-carrier within one OFDM symbol.

For example, the number of CCEs $N_{CCE}(i)$ available in each component band i (where i=0,1) shown in FIG. 4 calculated by equation 1 is $N_{CCE}(0)$=k and $N_{CCE}(1)$=j.

An ACK/NACK signal corresponding to the downlink data allocated using a CCE of the downlink component band in component band i in a certain subframe is mapped to PUCCH resource (ACK/NACK resource number) $n_{PUCCH}$ calculated according to next equation 2.

[2]

$$n_{PUCCH}=N_{PUCCH}+\Sigma_{m=0}^{i-1}N_{CCE}(m)+n_{CCE}(i) \quad \text{(Equation 2)}$$

Here, $N_{PUCCH}$ represents the starting position (resource number) of the PUCCH area corresponding to the downlink component band of component band i notified with SIB2 of the downlink component band of component band i and $n_{CCE}(i)$ represents the CCE number of a CCE used for PDCCH transmission in the downlink component band of component band (i+1). A case has been described with equation 2 where the starting position $N_{PUCCH}$ of the PUCCH area notified with SIB2 is used, but $N_{PUCCH}$ is unnecessary in equation 2 when PUCCH resources (ACK/NACK resources) to use for transmission of ACK/NACK signals is defined based on a relative position from the starting position of the entire PUCCH area arranged in the uplink component band.

For example, for each component band i (where i=0, 1) shown in FIG. 4, CCE number $n_{CCE}(i)$ in equation 2 is $n_{CCE}(0)$=1 to k and $n_{CCE}(1)$=1 to j.

Thus, as shown in FIG. 4, mapping section 214 sets k ACK/NACK resources #1 to #k from the starting position $N_{PUCCH}$ of the PUCCH area corresponding to the downlink component band of component band 0 notified with SIB2 of the downlink component band of component band 0 according to equation 2 as the PUCCH area corresponding to the downlink component band of component band 0. That is, as shown in FIG. 4, ACK/NACK resources #1 to #k are associated with CCEs #1 to #k of the downlink component band of component band 0.

Next, as shown in FIG. 4, mapping section 214 identifies the starting position ($N_{PUCCH}+N_{CCE}(0)$) of the PUCCH area corresponding to the downlink component band of component band 1 according to equation 2 based on the number of CCEs $N_{CCE}(0)=k$ calculated according to equation 1 and the starting position $N_{PUCCH}$ of the PUCCH area of component band 0. Mapping section 214 then sets j ACK/NACK resources #(k+1) to #(k+j) from the starting position ($N_{PUCCH}+N_{CCE}(0)$) according to equation 2 as the PUCCH area corresponding to the downlink component band of component band 1. That is, as shown in FIG. 4, ACK/NACK resources #(k+1) to #(k+j) are associated with CCEs #1 to #j of the downlink component band of component band 1 respectively.

Mapping section 214 then maps ACK/NACK signals corresponding to the downlink data allocated using CCEs #1 to #k of component band 0 shown in FIG. 4 to ACK/NACK resources #1 to #k in the PUCCH area directed to component band 0. Furthermore, as shown in FIG. 4, mapping section 214 maps ACK/NACK signals corresponding to the downlink data allocated using CCEs #1 to #j of component band 1 to ACK/NACK resources #(k+1) to #(k+j) in the PUCCH area directed to component band 1. That is, mapping section 214 sets the starting position of the PUCCH area corresponding to the downlink component band of component band 1 to be variable based on CFI information (CFI0 in FIG. 4), that is, the number of CCEs available in the downlink component band of component band 0. In other words, mapping section 214 sets the end position of the PUCCH area corresponding to the downlink component band of component band 0 to be variable based on CFI information (CFI0 in FIG. 4), that is, the number of CCEs available in the downlink component band of component band 0. To be more specific, mapping section 214 secures the PUCCH area corresponding to the downlink component band of component band 0 by the number corresponding to the number of CCEs available in the downlink component band of component band 0.

On the other hand, ACK/NACK receiving section 122 of base station 100 calculates the number of CCEs $N_{CCE}$ of each downlink component band according to equation 1 based on CFI0 and CFI1 inputted from control section 102 as in the case of terminal 200. ACK/NACK receiving section 122 then sets the PUCCH area (ACK/NACK resources #1 to #k shown in FIG. 4) corresponding to the downlink component band of component band 0 and the PUCCH area (ACK/NACK resources #(k+1) to #(k+j) shown in FIG. 4) corresponding to the downlink component band of component band 1 as in the case of terminal 200. ACK/NACK receiving section 122 then extracts ACK/NACK signals corresponding to the PDSCH signal of each downlink component band from ACK/NACK resources associated with the CCE number of the CCE to which the PDCCH signal is allocated in the PUCCH area corresponding to each downlink component band.

Thus, terminal 200 controls, in the uplink component band set in the terminal, the starting position of the PUCCH area corresponding to each downlink component band per subframe based on the number of CCEs (the number of CCEs that can be transmitted by base station 100) available in each downlink component band calculated based on the CFI information of each downlink component band set in the terminal.

Here, ACK/NACK resources necessary for PUCCHs arranged in each uplink component band depend on the number of CCEs used in PDCCHs arranged in each downlink component band. Furthermore, the number of CCEs used for the PDCCHs arranged in each downlink component band differs from one subframe to another. That is, in each uplink component band, the PUCCH area corresponding to each downlink component band (the number of ACK/NACK resources associated with the CCEs of each downlink component band) differs from one subframe to another.

However, terminal 200 controls the starting position of the PUCCH area corresponding to each downlink component band by calculating the number of CCEs available in each downlink component band based on CFI information notified for every subframe. Thus, terminal 200 can secure the number of ACK/NACK resources corresponding to the number of CCEs available in each downlink component band (the number of CCEs that can be transmitted by base station 100) for every subframe. That is, terminal 200 can secure the number of CCEs available in each downlink component band, that is, ACK/NACK resources corresponding to the number of CCEs used to allocate for the PDSCH signal in each downlink component band. That is, in the uplink component band of component band 0 shown in FIG. 4, terminal 200 secures only necessary minimum ACK/NACK resources in both downlink component bands of component band 0 and component band 1.

Thus, according to the present embodiment, the terminal calculates the number of CCEs available in each downlink component band based on the CFI information notified from the base station for every subframe and controls the PUCCH area corresponding to each downlink component band based on the calculated number of CCEs. Thus, the terminal can secure, for every subframe, the necessary minimum PUCCH areas (ACK/NACK resources) corresponding to each downlink component band set in the terminal in the uplink component band set in the terminal. Furthermore, the terminal controls the PUCCH area based on the system information (SIB), which is existing signaling in LTE, and CFI information. That is, according to the present embodiment, signaling from the base station to the terminal need not be newly added for LTE-A. Thus, according to the present embodiment, even when a plurality of ACK/NACK signals corresponding to downlink data transmitted through a plurality of downlink component bands respectively are transmitted from one uplink component band, it is possible to reduce the PUCCH areas (number of ACK/NACK resources) in the uplink component band without increasing signaling.

Furthermore, according to the present embodiment, it is possible to secure more PUSCH resources by minimizing the PUCCH areas that need to be secured in the uplink component band and thereby improve uplink data throughput. Furthermore, signaling need not be newly added in the downlink component band and the number of PDCCH resources does not increase, and it is thereby possible to prevent the downlink data throughput from decreasing.

Furthermore, according to the present embodiment, the terminal arranges all PUCCH areas in one place together by causing PUCCH areas corresponding to the respective downlink component bands to neighbor each other in the uplink component band set in the terminal. For this reason, the terminal can allocate more continuous resources (RB) to a PUSCH signal. Here, when the base station allocates continuous RBs when allocating a PUSCH signal to the terminal, the base station needs only to notify the starting RB number and the number of RBs (or ending RB number), and can thereby reduce the number of notification bits to notify resource allocation and improve the resource allocation efficiency.

Furthermore, as in the case of, for example, LTE-A, when each downlink component band is a wideband (e.g. 20-MHz band), it may not be necessary to secure a maximum number of CCEs of each downlink component band which are secured with a maximum number of OFDM symbols (here, 3 OFDM symbols). This is because when each downlink component band is a wideband, there are many resources per OFDM symbol available for PDCCHs. That is, for many subframes, the probability is small that 3 OFDM symbols which is the maximum number of OFDM symbols (CFI information) used for a PDCCH will be required. That is, base station 100 can allocate a sufficient number of CCEs to a plurality of terminals without securing the maximum number of CCEs and secure sufficient frequency scheduling effects. For example, when a maximum of 80 CCEs can be secured with a 20-MHz downlink component band in 1 subframe, base station 100 may secure only 40 CCEs, half the maximum number of CCEs. Thus, terminal 200 needs to secure PUCCH areas for only 40 CCEs, half the number of CCEs calculated based on CFI information, and can thereby reduce the PUCCH areas and improve the throughput of uplink data.

The present embodiment has described the setting of PUCCHs in the uplink component band of component band 0 shown in FIG. 4 as an example of the setting of PUCCH areas. However, the present invention performs a setting of PUCCH areas also for PUCCHs in the uplink component band of component band 1 shown in FIG. 4 as in the case of the above embodiment.

Embodiment 2

The present embodiment sets a PUCCH area corresponding to a downlink component band associated with an uplink component band set in a terminal out of a plurality of downlink component bands set in the terminal at an end of the uplink component band than the PUCCH area corresponding to the downlink component band rather other than the downlink component band associated with the uplink component band.

Hereinafter, the present embodiment will be described more specifically. In the following descriptions, an uplink component band of component band i (where i is a component band number) is associated with a downlink component band of component band i. Here, the uplink component band associated with the downlink component band is notified with broadcast information of the downlink component band. Furthermore, PUCCH area information (PUCCH config shown in FIG. 5) indicating the starting position of the PUCCH area corresponding to the downlink component band of component band i in the uplink component band of component band i is notified from base station 100 (FIG. 1) to terminal 200 (FIG. 2) with broadcast information including system information (SIB2) allocated to the downlink component band of component band i.

Figure 5:
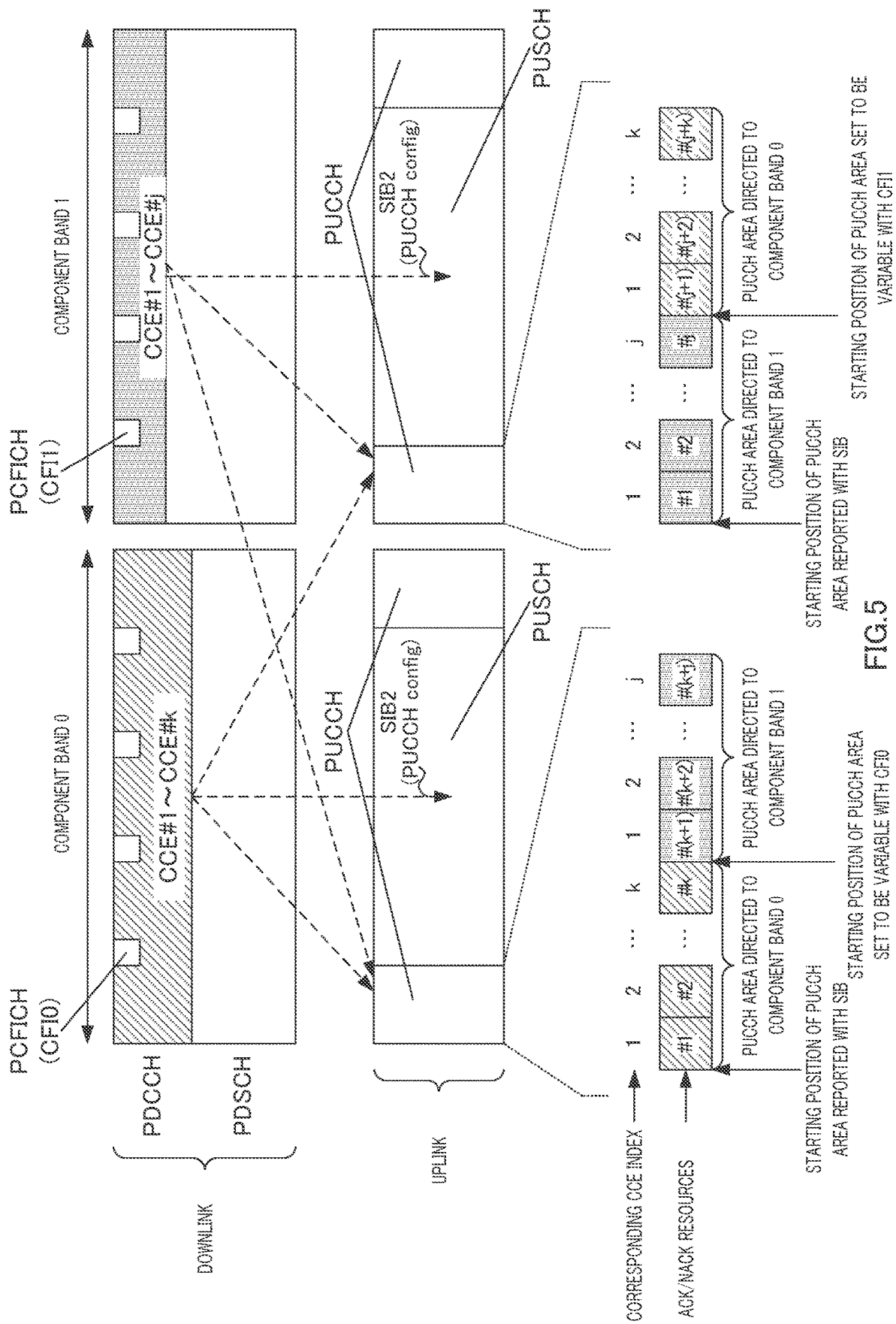
FIG. 5 is a diagram illustrating settings of PUCCH areas according to Embodiment 2 of the present invention (setting method 1)

For example, in FIG. 5, broadcast information generation section 108 of base station 100 sets system information (SIB2) indicating the starting position (resource number) of the PUCCH area corresponding to the downlink component band of component band 0 (component band 1) in the uplink component band of component band 0 (component band 1) in the downlink component band of component band 0 (component band 1).

Hereinafter, setting methods 1 and 2 of PUCCH areas (ACK/NACK resources) will be described.

<Setting Method 1>

In the present setting method, in the uplink component band set in the terminal, terminal 200 sets PUCCH areas corresponding to a plurality of downlink component bands in predetermined order of downlink component bands (component band numbers) from the downlink component band associated with the uplink component band out of a plurality of downlink component bands set in the terminal sequentially from the starting position of the resource area broadcast with a downlink component band associated with the uplink component band.

Here, setting section 101 of base station 100 (FIG. 1) sets two downlink component bands (component band 0 and component band 1) and one uplink component band (component band 0) of the system whose downlink and uplink shown in FIG. 5 are made up of two component bands respectively in terminal 1 and sets two downlink component bands (component band 0 and component band 1) and one uplink component band (component band 1) in terminal 2. Here, terminal 1 and terminal 2 are provided with the same configuration as that of terminal 200 (FIG. 2) in Embodiment 1.

Furthermore, as shown in FIG. 5 as in the case of Embodiment 1 (FIG. 4), suppose CFI information of component band 0 is CFI0 and CFI information of component band 1 is CFI1. Furthermore, as in the case of Embodiment 1 (FIG. 4), suppose the number of CCEs available in the downlink component band of component band 0 is k (CCEs #1 to #k) and the number of CCEs available in the downlink component band of component band 1 is j (CCEs #1 to #j) as shown in FIG. 5.

Therefore, allocation section 105 of base station 100 (FIG. 1) allocates a PDCCH signal of each terminal to one of CCEs #1 to #k of the downlink component band of component band 0 and CCEs #1 to #j of the downlink component band of component band 1 set in terminal 1 and terminal 2.

In the uplink component band of component band 0 or component band 1 shown in FIG. 5, each mapping section 214 of terminal 1 and terminal 2 maps ACK/NACK signals for downlink data allocated using CCEs #1 to #k of component band 0 respectively and ACK/NACK signals for downlink data allocated using CCEs #1 to #j of component band 1 respectively to PUCCH areas corresponding to the downlink component band used to allocate each piece of downlink data.

Here, PUCCH areas (ACK/NACK resources) used to transmit ACK/NACK signals corresponding to the downlink data allocated using CCEs of each downlink component band are sequentially set in order of component band numbers from a downlink component band associated with each uplink component band from an end of each uplink component band (that is, the starting position of the PUCCH area broadcast in the downlink component band associated with each uplink component band). To be more specific, in the uplink component band of component band i, PUCCH areas corresponding to the respective downlink component bands are set in order of component band(i), component band((i+1)mod $N_{cc}$), component band ((i+2)mod $N_{cc}$), . . . , component band ((i+$N_{cc}$−1)mod $N_{cc}$) from the starting position of the PUCCH area notified with SIB2 of the downlink component band of component band i. Where "operation mod" represents modulo operation and $N_{cc}$ represents the number of downlink component bands.

That is, as shown in FIG. 5, mapping section 214 of terminal 1 sets k ACK/NACK resources #1 to #k from the starting position of the PUCCH area corresponding to the downlink component band of component band 0 notified with SIB2 of the downlink component band of component band 0 in the uplink component band of component band 0 as the PUCCH area corresponding to the downlink component band of component band 0. Next, as in the case of Embodiment 1, as shown in FIG. 5, mapping section 214 of terminal 1 sets j ACK/NACK resources #(k+1) to #(k+j) from the starting position (#(k+1)) of the PUCCH area corresponding to the downlink component band of component band 1 (=(0+1)mod 2) as the PUCCH area corresponding to the downlink component band of component band 1. That is, as shown in FIG. 5, in order of the downlink component band of component band 0 and the downlink component band of component band 1, PUCCH areas corresponding to the respective downlink component bands are sequentially set from an end of the uplink component band of component band 0 (that is, starting position of the PUCCH area broadcast with SIB2 of the downlink component band of component band 0).

On the other hand, as shown in FIG. 5, mapping section 214 of terminal 2 sets j ACK/NACK resources #1 to #j from the starting position of the PUCCH area corresponding to the downlink component band of component band 1 notified by SIB2 of the downlink component band of component band 1 in the uplink component band of component band 1 as the PUCCH area corresponding to the downlink component band of component band 1. Next, mapping section 214 of terminal 2 sets k ACK/NACK resources #(j+1) to #(j+k) from the starting position (#(j+1)) of the PUCCH area corresponding to the downlink component band of component band 0 (=(1+1)mod 2) as the PUCCH area corresponding to the downlink component band of component band 0 as shown in FIG. 5. That is, as shown in FIG. 5, in order of the downlink component band of component band 1 and the downlink component band of component band 0, the PUCCH areas corresponding to the respective downlink component bands are set in order from an end of the uplink component band of component band 1 (that is, starting position of the PUCCH area broadcast with SIB2 of the downlink component band of component band 1).

That is, in each uplink component band, the PUCCH area corresponding to the downlink component band associated with each uplink component band is set at the end of the uplink component band rather than the PUCCH area corresponding to the downlink component band other than the downlink component band associated with the uplink component band. Then, the PUCCH areas corresponding to the downlink component band other than the downlink component bands associated with the uplink component band are sequentially set from the band (that is, the end of the uplink component band) in which PUCCHs corresponding to the downlink component band associated with each uplink component band are set toward the center frequency (that is, inside the uplink component band) of the uplink component band. Here, each terminal (terminal 200) controls the starting position of the PUCCH areas corresponding to the downlink component band other than the downlink component band associated with each uplink component band for every subframe based on the CFI information of each downlink component band as in the case of Embodiment 1.

In LTE-A, not only LTE-A terminals but also LTE terminals are required to be accommodated. Here, one uplink component band and one downlink component band are set in an LTE terminal. Furthermore, in that case, the uplink component band and downlink component band associated with each other are always set in the LTE terminal. That is, in the uplink component band set in the LTE terminal, the PUCCH areas used by the LTE terminal are fixedly set with SIB2 (broadcast information) of the downlink component band associated with the uplink component band.

In the uplink component band used by the LTE terminal according to the present setting method, the PUCCH area corresponding to the downlink component band (downlink component band used by the LTE terminal) associated with the uplink component band is always arranged at an end of the uplink component band. The PUCCH areas corresponding to the downlink component bands (e.g. downlink component band used only by the LTE-A terminal) other than the downlink component band associated with the uplink component band used by the LTE terminal are arranged inside the uplink component band rather than the PUCCH area corresponding to the downlink component band used by the LTE terminal based on CFI information. Thus, it is possible to continuously arrange the respective PUCCH areas corresponding to a plurality of downlink component bands from the end of the uplink component band toward the carrier frequency (center frequency) of the uplink component band. That is, as in the case of Embodiment 1, terminal 200 can set the starting position of PUCCH areas corresponding to the downlink component band other than the downlink component band associated with the uplink component band used by the LTE terminal to be variable based on the CFI information and set the PUCCH areas in continuous bands from the end of the uplink component band set in the terminal without any gap. Therefore, according to the present setting method, it is possible to minimize PUCCH areas as in the case of Embodiment 1.

Thus, according to the present setting method, it is possible to reduce PUCCH areas as in the case of Embodiment 1 while supporting LTE terminals in each uplink component band even when LTE-A terminals and LTE terminals coexist.

Furthermore, according to the present setting method, in a certain uplink component band, a PUCCH area whose starting position is controlled according to CFI information (e.g. PUCCH area corresponding to a downlink component band used only by LTE-A terminals) is arranged to be variable inside the PUCCH area corresponding to the downlink component band corresponding to the uplink component band. Thus, even when the amount of PUCCH resources is small because, for example, CFI information is small, PUCCH areas are always arranged together at an end of an uplink component band. For this reason, according to the present setting method, it is possible to secure resources of continuous widebands as PUSCH resources and improve resources allocation efficiency.

Furthermore, according to the present setting method, the terminal sets PUCCH areas in order of component bands preset in each uplink component band based on the starting position of the PUCCH area notified with SIB2 of the downlink component band associated with the uplink component band and the number of downlink component bands $N_{cc}$ of the system. Thus, the terminal can uniformly identify PUCCH areas corresponding to all downlink component bands using only existing control information, making new signaling unnecessary.

Figure 6:
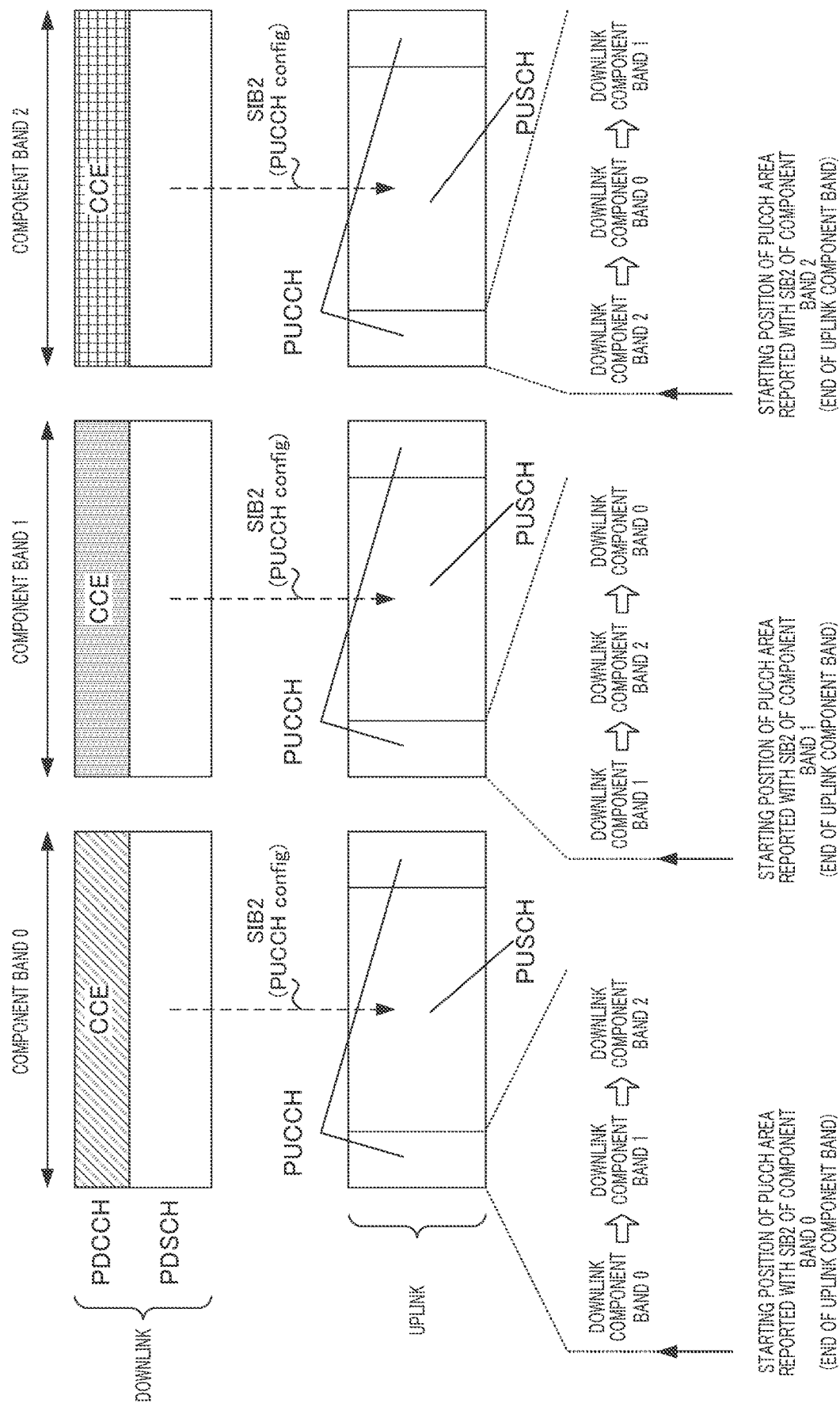
FIG. 6 is a diagram illustrating settings of PUCCH areas according to Embodiment 2 of the present invention (setting method 1)

A case has been described in the present setting method where the number of component bands of the system is two (FIG. 5). However, in the present invention, the number of component bands of the system is not limited to two. For example, a case where the number of component bands of the system is three will be described using FIG. 6. As shown in FIG. 6, in an uplink component band of component band 0, PUCCH areas corresponding to the respective downlink component bands of component band 0, component band 1 and component band 2 are set in order from the end of the uplink component band (starting position of the PUCCH area notified with SIB2 of component band 0). Similarly, as shown in FIG. 6, in the uplink component band of component band 1, PUCCH areas corresponding to the respective downlink component bands of component band 1, component band 2 and component band 0 are set in order from the end of the uplink component band (starting position of the PUCCH area notified with SIB2 of component band 1). The same applies to the uplink component band of component band 2.

<Setting Method 2>

In the present setting method, in an uplink component band set in the terminal, terminal 200 sets PUCCH areas corresponding to a plurality of downlink component bands from an end of the uplink component band in order of closeness to the carrier frequency of the downlink component band associated with uplink component bands from the downlink component bands associated with uplink component bands of a plurality of downlink component bands set in the terminal.

In the following descriptions, a case where the number of component bands of the system is three will be described.

Figure 7:
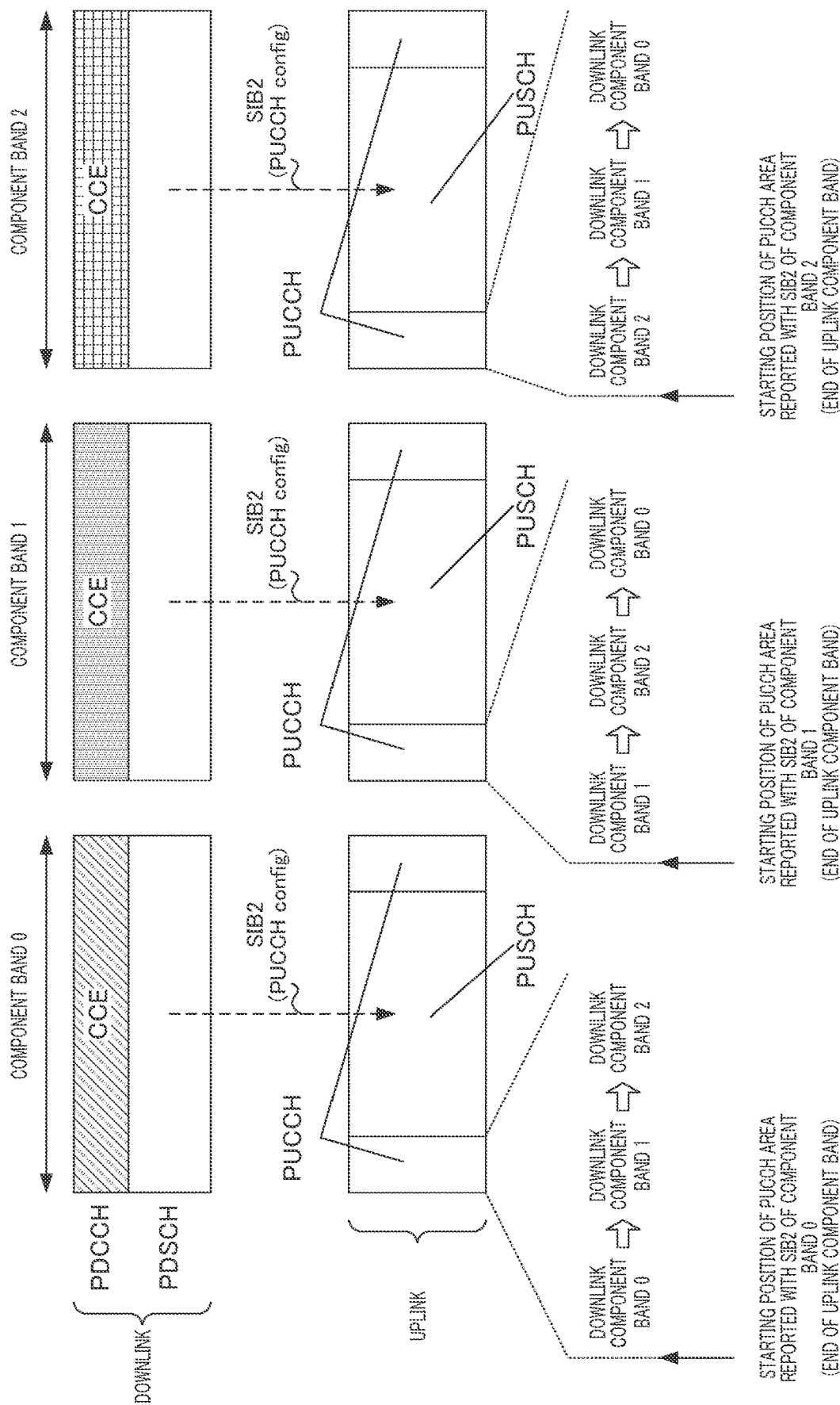
FIG. 7 is a diagram illustrating settings of PUCCH areas according to Embodiment 2 of the present invention (setting method 2)

For example, as shown in FIG. 7, in an uplink component band of component band 0, PUCCH areas corresponding to respective downlink component bands are set in order of component band 0, component band 1 and component band 2 from the end of the uplink component band (the starting position of a PUCCH area of component band 0 notified with SIB2). That is, terminal 200 in which the uplink component band of component band 0 is set sets PUCCH areas from the end of the uplink component band of component band 0 in order of the PUCCH area corresponding to the downlink component band of component band 0, the PUCCH area corresponding to the downlink component band of component band 1 closest to the carrier frequency of the downlink component band of component band 0 and the PUCCH area corresponding to the downlink component band of component band 2 farthest from the carrier frequency of the downlink component band of component band 0.

On the other hand, as shown in FIG. 7, in the uplink component band of component band 2, PUCCH areas corresponding to the respective downlink component bands are set in order of component band 2, component band 1 and component band 0 from the end of the uplink component band (the starting position of a PUCCH area of component band 2 notified with SIB2). That is, terminal 200 in which the uplink component band of component band 2 is set sets PUCCH areas from the end of the uplink component band of component band 2 in order of the PUCCH area corresponding to the downlink component band of component band 2, the PUCCH area corresponding to the downlink component band of component band 1 closest to the carrier frequency of the downlink component band of component band 2 and the PUCCH area corresponding to the downlink component band of component band 0 farthest from the carrier frequency of the downlink component band of component band 2.

In the uplink component band of component band 1 located in the center of a plurality of component bands in FIG. 7, (that is, component band adjacent to component band 0 and component band 2), PUCCH areas corresponding to the respective downlink component bands are set from the end of the uplink component band in order of component band 1, component band 2 and component band 0 as in the case of setting method 1 in FIG. 6. However, in the uplink component band of component band 1, PUCCH areas corresponding to the respective downlink component bands may be set from the end of the uplink component band in order of component band 1, component band 0 and component band 2. Furthermore, as in the case of Embodiment 1, terminal 200 sets the starting position of the PUCCH area corresponding to each downlink component band to be variable based on CFI information.

Here, in the initial stage of introduction of an LTE-A system, a case is conceivable where there are many terminals of limited bandwidth (e.g. 40-MHz band). For example, in FIG. 7, if the reception bandwidth is assumed to be 20 MHz per component band, a case is conceivable where there are many terminals that receive downlink data using only two continuous downlink component bands (40 MHz band). In this case, according to the present setting method, there is a high possibility that two PUCCH areas corresponding to two continuous downlink component bands may be arranged in neighboring bands within the uplink component band and arranged together at an end of the uplink component band.

For example, in FIG. 7, when two downlink component bands of component band 1 and component band 2 are set in terminal 200 and one of uplink component bands of component band 1 and component band 2 is set, terminal 200 sets the PUCCH area corresponding to each downlink component band at the end of the uplink component band. To be more specific, terminal 200 in which the uplink component band of component band 1 shown in FIG. 7 is set sets PUCCH areas corresponding to the respective downlink component bands at the end of the uplink component band in order of component band 1 and component band 2. Similarly, terminal 200 in which the uplink component band of component band 2 shown in FIG. 7 is set sets PUCCH areas corresponding to the respective downlink component bands at the end of the uplink component band in order of component band 2 and component band 1. Thus, in each uplink component band, it is possible to set an unused PUCCH area (here, PUCCH area corresponding to the downlink component band of component band 0) in a band inside the uplink component band, and thereby secure more continuous resources for PUSCHs.

Furthermore, the terminal having a limited reception bandwidth can appropriately set PUCCH areas (ACK/NACK resources) to which ACK/NACK signals corresponding to downlink data directed to the terminal are allocated without knowing CFI information of the downlink component band other than the reception bandwidth of the terminal. For example, in FIG. 7, when two downlink component bands; component band 1 and component band 2 are set in terminal 200, terminal 200 can set PUCCH areas of the uplink component band (component band 1 or component band 2) based on only CFI information of component band 1 and component band 2 without knowing CFI information of component band 0.

Thus, according to the present setting method, even when there are many terminals having limited reception bandwidths, there is a high possibility that PUCCH areas are used in order starting from the one set at the end of each uplink component band. That is, since PUCCH areas not used by terminals having limited reception bandwidths are set in a band inside the uplink component band, it is possible to secure continuous wideband resources as PUSCH resources.

Furthermore, in the present setting method, PUCCH areas corresponding to the downlink component band associated with the uplink component bands are set at the end of the uplink component band rather than the PUCCH areas corresponding to the downlink component band other than the downlink component band associated with the uplink component band. Furthermore, as in the case of Embodiment 1, terminal 200 sets the starting position of the PUCCH area corresponding to each downlink component band to be variable based on CFI information. Therefore, according to the present setting method, as in the case of setting method 1, even when LTE-A terminals and LTE terminals coexist, it is possible to reduce PUCCH areas while supporting LTE terminals in each uplink component band as in the case of Embodiment 1.

A case has been described in the present setting method where the number of component bands in the system is three (FIG. 7). However, in the present invention, the number of component bands of the system is not limited to three. For example, a case where the number of component bands of the system is four will be described. Here, suppose each uplink component band of component band 0 to 4 is associated with each downlink component band (not shown). Therefore, in the uplink component band of component band 0, PUCCH areas corresponding to the respective downlink component bands are set from the end of the uplink component band in order of component bands 0, 1, 2 and 3. Similarly, in the uplink component band of component band 1, PUCCH areas corresponding to the respective downlink component bands are set from the end of the uplink component band in order of component bands 1, 0, 2 and 3 (or component bands 1, 2, 0 and 3). Similarly, in the uplink component band of component band 2, PUCCH areas corresponding to the respective downlink component bands are set from the end of the uplink component band in order of component bands 2, 1, 3 and 0 (or component bands 2, 3, 1 and 0). Similarly, in the uplink component band of component band 3, PUCCH areas corresponding to the respective downlink component bands are set from the end of the uplink component band in order of component bands 3, 2, 1 and 0.

PUCCH area setting methods 1 and 2 according to the present embodiment have been described so far.

Even when LTE terminals coexist with LTE-A, the present embodiment can reduce PUCCH areas (number of ACK/NACK resources) in the uplink component band without increasing signaling while supporting the LTE terminals as in the case of Embodiment 1.

Figure 8:
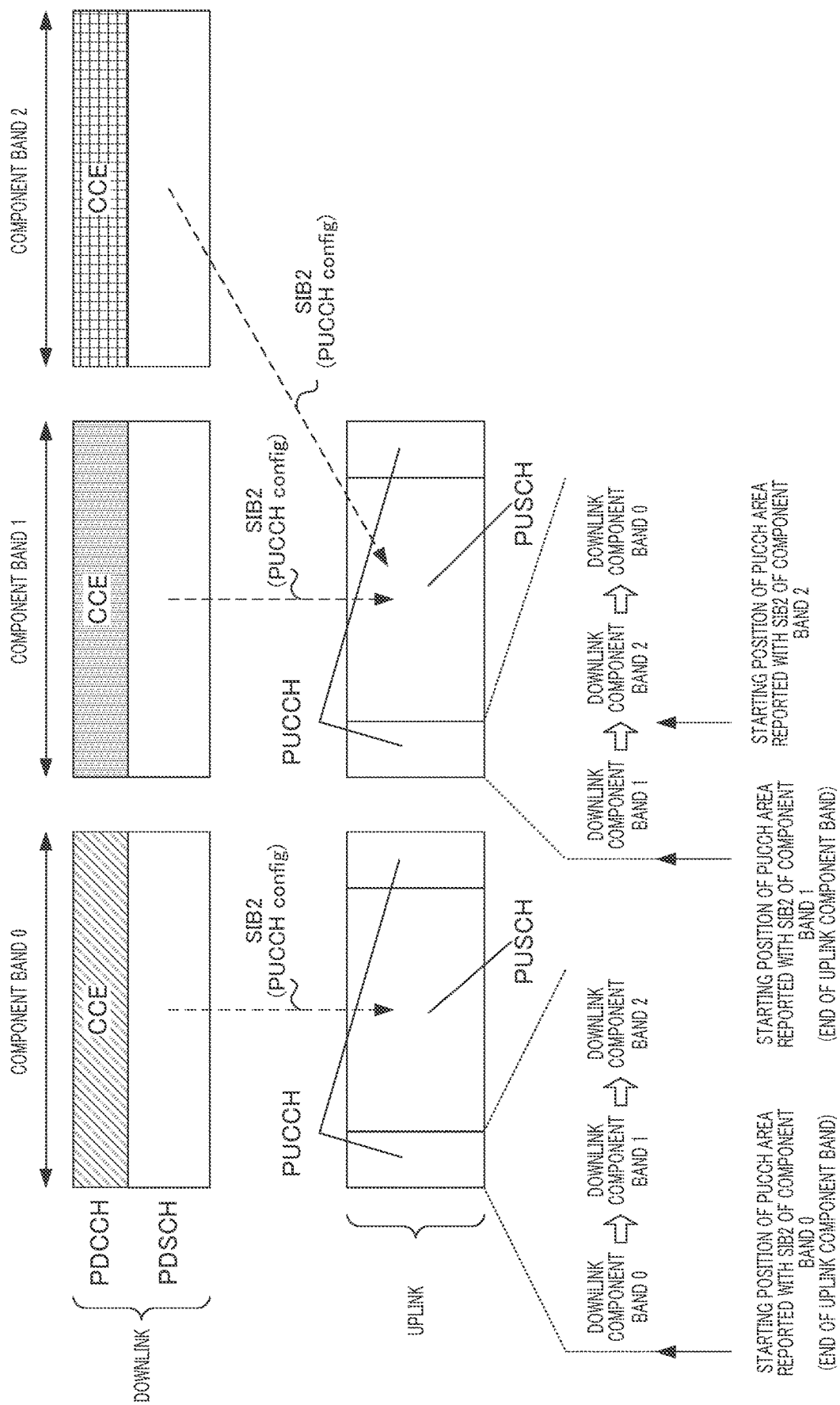
FIG. 8 is a diagram illustrating settings of PUCCH areas according to Embodiment 2 of the present invention (case with asymmetric setting)

The present embodiment has described the system in which the uplink component band and the downlink component band are symmetric. However, the present invention is also applicable when the uplink component band and the downlink component band are asymmetric. For example, as shown in FIG. 8, when uplink component bands (two uplink component bands) and downlink component bands (three downlink component bands) are asymmetric, a certain uplink component band (component band 1 in FIG. 8) may be associated with a plurality of downlink component bands (component bands 1 and 2 in FIG. 8). In this case, the starting position of the PUCCH area corresponding to each downlink component band is notified to the terminal with SIB2 of the downlink component bands of component bands 1 and 2 shown in FIG. 8. In this case, as shown in FIG. 8, in the uplink component band of component band 1, the terminal fixedly sets PUCCH areas corresponding to the respective downlink component bands of component band 1 and component band 2 based on the starting position of a PUCCH area notified with SIB2 of each downlink component band. On the other hand, the terminal sets the PUCCH areas corresponding to the downlink component band other than the downlink component band associated with the uplink component band of component band 1 (component band 0 in FIG. 8) to be variable as in the case of aforementioned setting method 1 or setting method 2.

In FIGS. 6 to 8, the starting position of a PUCCH area notified with SIB2 need not always be the end of the band of the uplink component band and the base station can freely set it. For example, according to LTE, the base station provides an offset corresponding to fixed resources used to transmit CQI information set by a parameter called $N_{RB}^{(2)}$ and then sets a PUCCH area for ACK/NACK signals. In this case, by setting resources for transmission of CQI information that needs to be secured fixedly at the end of the band of the component band, it is possible to secure more continuous and wider resources for PUSCHs as in the case of the above described effects.

Embodiment 3

In the present embodiment, a base station sets common CFI information among a plurality of downlink component bands.

Control section 102 of base station 100 according to the present embodiment (FIG. 1) uniformly allocates downlink data directed to each terminal among a plurality of downlink component bands set in each terminal and thereby performs control so that the number of CCEs used to allocate downlink data becomes uniform among a plurality of downlink component bands. That is, control section 102 equalizes the number of OFDM symbols used for transmission of PDCCH signals among all downlink component bands. Thus, control section 102 sets common CFI information among the plurality of downlink component bands. Control section 102 then outputs the set CFI information to PCFICH generation section 106.

PCFICH generation section 106 generates PCFICH signals based on CFI information inputted from control section 102, that is, common CFI information among the respective downlink component bands.

Figure 9:
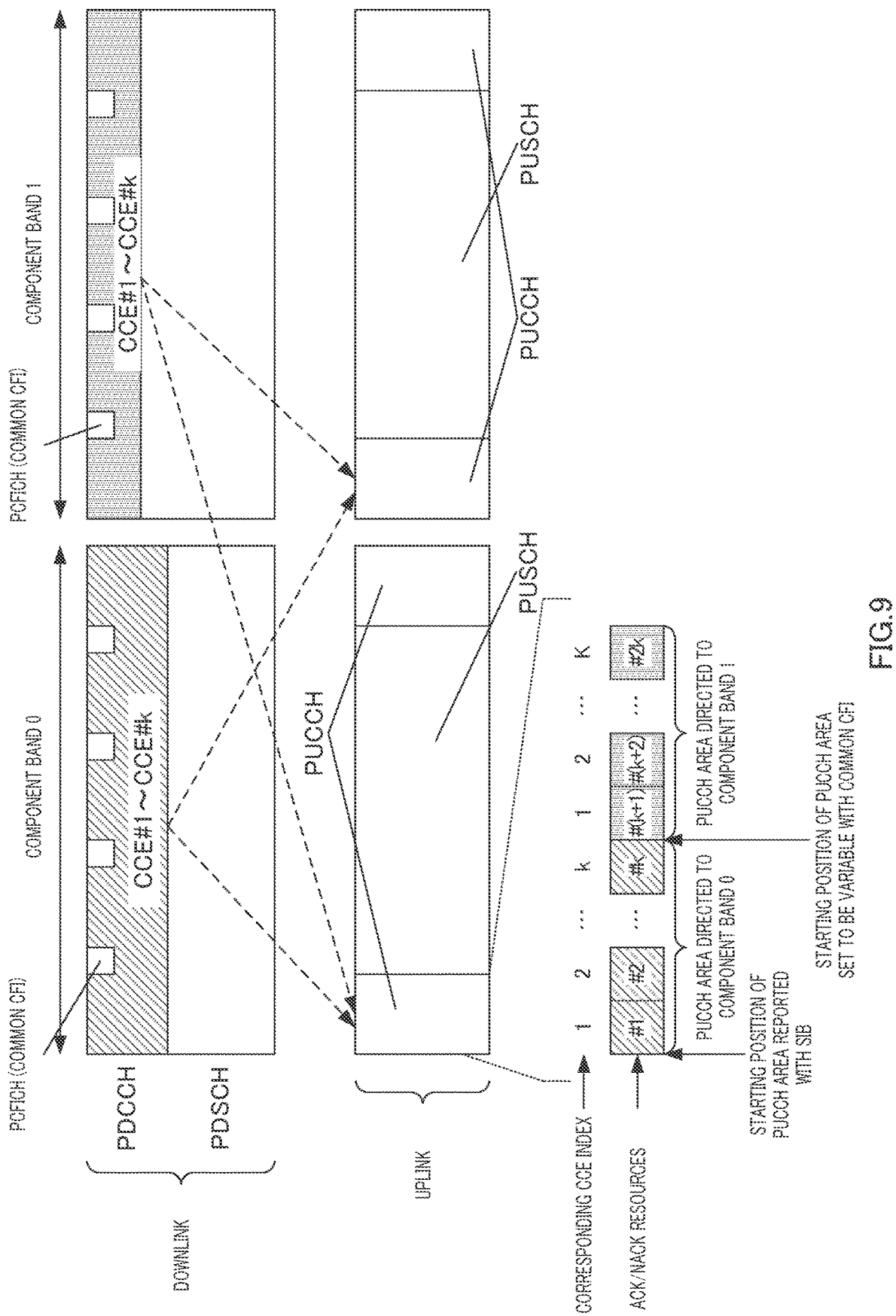
FIG. 9 is a diagram illustrating settings of PUCCH areas according to Embodiment 3 of the present invention.

Next, details of operations of base station 100 and terminal 200 according to the present embodiment will be described. Here, as shown in FIG. 9, a case will be described where the number of component bands of the system is two. Furthermore, base station 100 sets two downlink component bands of component band 0 and component band 1 and an uplink component band of component band 0 for terminal 200.

As shown in FIG. 9, control section 102 of base station 100 sets common CFI information in the respective downlink component bands of component band 0 and component band 1.

Furthermore, control section 102 sets to k, the number of CCEs available in the downlink component bands of component band 0 and component band 1 set in terminal 200. That is, control section 102 uniformly sets the number of CCEs available in the respective downlink component bands for terminal 200. Thus, allocation section 105 allocates PDCCH signals of the respective downlink component bands to one of CCEs #1 to #k of the downlink component band of component band 0 and CCEs #1 to #k of the downlink component band of component band 1 set in terminal 200.

Mapping section 214 of terminal 200 then maps ACK/NACK signals corresponding to downlink data allocated using CCEs #1 to #k of component band 0 shown in FIG. 9 and ACK/NACK signals corresponding to downlink data allocated using CCEs #1 to #k of component band 1 shown in FIG. 9 to PUCCH areas associated with the respective downlink component bands.

Here, PUCCH areas (ACK/NACK resources) used for transmission of ACK/NACK signals corresponding to the downlink data allocated using CCEs of the respective downlink component bands are calculated according to equation 2 of Embodiment 1. Here, the number of CCEs $N_{CCE}(i)$ available in a downlink component band of component band i in a certain subframe can be calculated according to next equation 3 instead of equation 1 of Embodiment 1.

[3]

$$N_{CCE}(i)(L_{com} * N_{RE\_total} - N_{RS} - N_{PCFICH} - N_{PHICH})/N_{RE\_CCE} \quad \text{(Equation 3)}$$

Here, $L_{com}$ represents common CFI information (e.g. $L_{com}$=1 to 3) among a plurality of downlink component bands. That is, equation 3 is an equation where L(i) of equation 1 is replaced by Loom (common CFI information).

For example, a reception error of a PCFICH signal of a certain downlink component band may occur out of a plurality of downlink component bands (component bands 0 and 2 in FIG. 9) set in terminal 200. Here, when the bandwidths of the respective downlink component bands are the same, the maximum number of CCEs (number of CCEs available in each downlink component band) calculated based on CFI information of each downlink component band is also the same. For this reason, in each uplink component band (component band 0 in FIG. 9), the size of the PUCCH area corresponding to each downlink component band (k ACK/NACK resources in FIG. 9) is the same.

Thus, base station 100 sets common CFI information for each downlink component band, and even when a reception error occurs in a PCFICH signal of the downlink component band, if terminal 200 can normally decode PCFICH signals of one downlink component band other than the downlink component band in which the reception error has occurred, it is possible to identify PCFICH signals of all downlink component bands. That is, terminal 200 may use CFI information of any downlink component band when setting PUCCH areas corresponding to the respective downlink component bands. In the downlink component band in which terminal 200 has successfully received a PDCCH signal, CFI information has been received normally. That is, upon successfully receiving a PDCCH signal of the downlink component band, terminal 200 can identify the PUCCH area corresponding to the downlink component band set in the terminal.

Therefore, even when a reception error of a PCFICH signal in a certain downlink component band occurs, terminal 200 can prevent an ACK/NACK signal corresponding to a PDSCH signal in a certain downlink component band from being transmitted with an erroneous PUCCH area and base station 100 can prevent collision of ACK/NACK with other terminals.

Even when the bandwidths of the respective downlink component bands differ from each other, base station 100 may notify information indicating the bandwidth of each downlink component band to each terminal. Furthermore, base station 100 allocates a number of CCEs generally proportional to the bandwidth to each component band and thereby sets a common CFI among component bands having different bandwidths. By this means, each terminal can identify PUCCH areas corresponding to other downlink component bands based on CFI information of a downlink component band in which the PDCCH signal has been received normally and information indicating a bandwidth of each downlink component band. Thus, even when the bandwidths of the respective downlink component bands differ from each other, terminal 200 can prevent transmission of ACK/NACK signals to a PDSCH signal in a downlink component band with wrong PUCCH areas.

Furthermore, when a certain downlink component band out of a plurality of downlink component bands set in terminal 200 is in DRX (Discontinuous Reception: data non-reception), terminal 200 needs to receive CFI information (PCFICH signal) of the downlink component band in DRX to set the PUCCH area in the uplink component band associated with the downlink component band. Furthermore, a terminal having a limited reception bandwidth cannot receive CFI information of the downlink component band in DRX simultaneously with CFI information of other downlink component bands. However, by setting CFI information common to the respective downlink component bands, terminal 200 can identify CFI information of the downlink component band in DRX based on the CFI information of the downlink component band other than the downlink component band in DRX.

Thus, even when there is a downlink component band in DRX, terminal 200 can set a PUCCH area corresponding to each downlink component band without receiving CFI information in the downlink component band in DRX. That is, terminal 200 need not stop DRX in the downlink component band in DRX to receive CFI information, and can thereby prevent the power reduction effect of DRX from deteriorating. Furthermore, even when terminal 200 having a limited reception bandwidth cannot receive CFI information in a downlink component band in DRX simultaneously with CFI information of other downlink component bands, terminal 200 can identify the CFI information of the downlink component band in DRX based on the CFI information of other downlink component bands.

Thus, according to the present embodiment, using common CFI information among a plurality of downlink component bands, it is possible to reduce, even when the terminal cannot receive CFI information of a certain downlink component band, PUCCH areas (number of ACK/NACK resources) in an uplink component band without increasing signaling as in the case of Embodiment 1.

Furthermore, according to the present embodiment, the base station sets common CFI information among a plurality of downlink component bands and also allocates downlink data directed to a plurality of terminals. For this reason, through averaging effects, data is allocated substantially uniformly among a plurality of downlink component bands. Thus, even when the base station sets common CFI information among a plurality of downlink component bands, there will be almost no deterioration in throughput.

Embodiment 4

A PDCCH arranged in each downlink component band includes not only resource allocation information (RB allocation information) directed to each terminal but also MCS (Modulation and Coding Scheme) information, HARQ (Hybrid Automatic Retransmission reQuest) information and PUCCH TPC (Transmission Power Control) bit for controlling transmission power of the PUCCH or the like. Here, when a plurality of ACK/NACK signals corresponding to downlink data transmitted in a plurality of downlink component bands are transmitted from one uplink component band, the terminal needs only to receive a notification of the PUCCH transmission power control bit from the downlink component band associated with the uplink component band although the PUCCH transmission power control bit is not notified from the plurality of downlink component bands.

On the contrary, when the PUCCH transmission power control bit is notified from the plurality of set downlink component bands, the terminal may simultaneously receive a plurality of PUCCH transmission power control bits in a plurality of downlink component bands and thereby may not be able to appropriately perform transmission power control of the PUCCH. Here, the PUCCH transmission power control bit is represented by a relative value (e.g. −1 dB, 0 dB, +1 dB, +2 dB) with respect to transmission power at the time of previous transmission.

Therefore, when, for example, the PUCCH transmission power control bits of two downlink component bands show −1 dB respectively, the terminal transmits the PUCCH with transmission power of −2 dB. On the other hand, when the PUCCH transmission power control bits of the two downlink component bands show −1 dB, if a reception error of one PUCCH transmission power control bit occurs, the terminal transmits the PUCCH with transmission power of −1 dB. Thus, when the PUCCH transmission power control bits are notified from a plurality of downlink component bands, the terminal may not appropriately perform transmission power control of the PUCCH.

Thus, according to the present embodiment, the base station notifies CFI information of other downlink component bands using the field of the PUCCH transmission power control bit of a PDCCH of a certain downlink component band to a terminal in which a plurality of downlink component bands are set. To be more specific, the base station allocates CFI information of the downlink component band associated with the uplink component band set in the terminal to the field of the PUCCH transmission power control bits of the PDCCHs arranged in the downlink component band other than the downlink component band associated with the uplink component band set in the terminal out of a plurality of downlink component bands set in the terminal.

Control section 102 of base station 100 according to the present embodiment (FIG. 1) allocates the PUCCH transmission power control bit corresponding to the uplink component band set in the terminal to the field of the PUCCH transmission power control bits of the PDCCHs arranged in the downlink component band associated with the uplink component band set in the terminal to which resources are allocated. On the other hand, control section 102 allocates the CFI information of the downlink component band associated with the uplink component band set in the terminal to the field of the PUCCH transmission power control bits of the PDCCHs arranged in the downlink component band other than the downlink component band associated with the uplink component band set in the terminal to which resources are allocated.

PDCCH receiving section 209 of terminal 200 according to the present embodiment (FIG. 2) blind-decodes a PDCCH signal inputted from demultiplexing section 205 and obtains a PDCCH signal directed to the terminal. Here, PDCCH receiving section 209 decides contents of control information allocated to the field of the PUCCH transmission power control bit in the PDCCH signal depending on whether the downlink component band to which the PDCCH signal directed to the terminal is allocated is the downlink component band associated with the uplink component band set in the terminal or not.

To be more specific, PDCCH receiving section 209 extracts control information allocated to the field of the PUCCH transmission power control bit in the PDCCH signal as the PUCCH transmission power control bit in the downlink component band associated with the uplink component band set in the terminal. PDCCH receiving section 209 then outputs the transmission power value shown in the extracted PUCCH transmission power control bit to RF transmitting section 217 (not shown).

On the other hand, PDCCH receiving section 209 extracts the control information allocated to the field of the PUCCH transmission power control bit in the PDCCH signal as CFI information of the downlink component band associated with the uplink component band set in the terminal in the downlink component band other than the downlink component band associated with the uplink component band set in the terminal. PDCCH receiving section 209 then outputs the extracted CFI information to mapping section 214.

Mapping section 214 maps an ACK/NACK signal inputted from modulation section 211 to a PUCCH arranged in the uplink component band based on the CFI information inputted from PCFICH receiving section 208, CFI information inputted from PDCCH receiving section 209 and CCE number inputted from PDCCH receiving section 209. That is, mapping section 214 sets the starting position of the PUCCH area corresponding to each downlink component band in the uplink component band set in the terminal based on the CFI information of each downlink component band in the same way as in Embodiment 1 or 2. However, upon receiving the CFI information from PDCCH receiving section 209 as input, mapping section 214 uses the CFI information as CFI information of the downlink component band associated with the uplink component band set in the terminal. That is, terminal 200 sets PUCCH areas corresponding to a plurality of downlink component bands using CFI information of the downlink component band associated with the uplink component band allocated to PDCCHs in the downlink component band other than the downlink component band associated with the uplink component band set in the terminal out of the plurality of downlink component bands set in the terminal.

Figure 10:
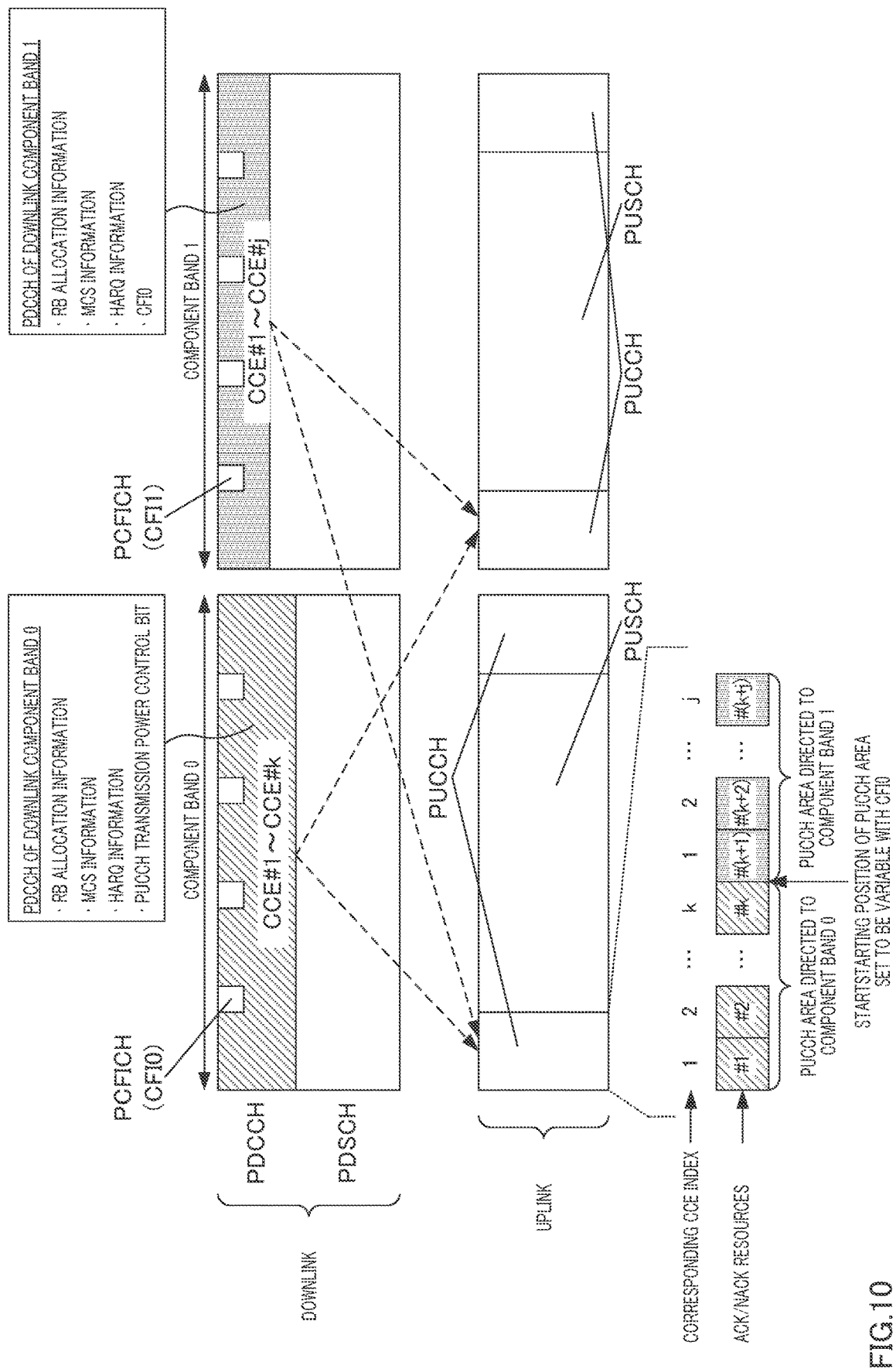
FIG. 10 is a diagram illustrating settings of PUCCH areas according to Embodiment 4 of the present invention.

Next, details of operations of base station 100 and terminal 200 according to the present embodiment will be described. Here, as shown in FIG. 10, a case will be described where the number of component bands of the system is two. Furthermore, base station 100 sets the respective downlink component bands of component band 0 and component band 1, and the uplink component band of component band 0 for terminal 200. Furthermore, as shown FIG. 10, the fields of various types of control information such as RB allocation information, MCS information, HARQ information and PUCCH transmission power control bit are set in the PDCCH arranged in each downlink component band.

As shown in FIG. 10, control section 102 of base station 100 allocates, for example, RB allocation information (resource allocation information), MCS information, HARQ information and PUCCH transmission power control bit to the PDCCH arranged in the downlink component band of component band 0 associated with the uplink component band of component band 0 set in terminal 200.

On the other hand, as shown in FIG. 10, control section 102 allocates, for example, RB allocation information, MCS information, HARQ information and CFI information (CFI0) of the downlink component band of component band 0 to the PDCCH arranged in the downlink component band of component band 1 other than the downlink component band associated with the uplink component band of component band 0 set in terminal 200. That is, control section 102 allocates CFI information of the downlink component band associated with the uplink component band set in terminal 200, instead of the PUCCH transmission power control bit, to the field of the PUCCH transmission power control bit of the downlink component band other than the downlink component band associated with the uplink component band set in terminal 200.

On the other hand, as shown in FIG. 10, mapping section 214 of terminal 200 sets the starting position of the PUCCH area corresponding to the downlink component band of component band 1 using CFI as in the case of Embodiment 1 or 2. As in the case of Embodiment 2, mapping section 214 sets the PUCCH area corresponding to the downlink component band associated with the uplink component band set in the terminal out of the plurality of downlink component bands set in the terminal at the end of the uplink component band rather than in the PUCCH area corresponding to the downlink component band other than the downlink component band associated with the uplink component band.

Here, mapping section 214 sets the starting position of the PUCCH area corresponding to the downlink component band of component band 1 using CFI0 inputted from PCFICH receiving section 208 (CFI0 allocated to the PCFICH of component band 0 shown in FIG. 10) or CFI0 inputted from PDCCH receiving section 209 (CFI0 allocated to the field of the PUCCH transmission power control bit of the PDCCH of component band 1 shown in FIG. 10).

Thus, even when, for example, a reception error occurs in the PCFICH signal (CFI0) of the downlink component band of component band 0 shown in FIG. 10, if terminal 200 can normally decode the PDCCH signal of the downlink component band of component band 1, terminal 200 can identify CFI0 of the downlink component band of component band 0. That is, even when a reception error occurs in the PCFICH signal (CFI0) of the downlink component band of component band 0, terminal 200 can set the starting position of the PUCCH area of component band 1 based on CFI0.

Furthermore, the downlink component band (component band 0 in FIG. 10) associated with the uplink component band (component band 0 in FIG. 10) set in terminal 200, that is, CFI information (CFI0 in FIG. 10) of the downlink component band for which the PUCCH area is set at the end of the uplink component band (component band 0 in FIG. 10) is notified through the PDCCH of the other downlink component band (component band 1 in FIG. 10). Thus, even when terminal 200 fails to receive the PCFICH signal of the downlink component band (component band 0 in FIG. 10) in which the PUCCH area is set at the end of the uplink component band, it is possible to identify CFI information of the downlink component band corresponding to reception the failure through the PDCCH signal of the other downlink component band (component band 1 in FIG. 10). Here, since the PDCCH is subjected to error detection by CRC, if the PDCCH results in CRC=OK, the CFI information transmitted there is accurate with an extremely high probability.

On the other hand, since the PCFICH cannot be subjected to error detection, the reliability thereof is lower than that of the CFI information in the PDCCH. Therefore, terminal 200 preferentially uses CFI information notified in the PDCCH to identify PUCCH resources.

Therefore, even if the reception of the PCFICH signal of the downlink component band for which the PUCCH area is set at the end of the uplink component band fails, it is possible to prevent terminal 200 from transmitting an ACK/NACK signal in the wrong PUCCH area and allow base station 100 to prevent collision of ACK/NACK signals with other terminals.

When, for example, two downlink component bands are set in terminal 200, it is possible for base station 100 to completely prevent collision of ACK/NACK signals between terminals by terminal 200 correctly receiving the PDCCH signal (CFI0) of component band 1 shown in FIG. 10. Furthermore, when the number of downlink component bands set in terminal 200 is three, and, for example, component band 2 (not shown) is used in addition to component band 0 and component band 1 shown in FIG. 10, if terminal 200 correctly receives the PDCCH signal (CFI0) of component band 1 and correctly receives the PDCCH signal (CFI1) of component band 2, it is possible for base station 100 to completely prevent collision of ACK/NACK signals between terminals.

Thus, according to the present embodiment, even when a reception error of the PCFICH signal occurs in the downlink component band associated with the uplink component band set in the terminal, that is, the downlink component band for which a PUCCH area is set at the end of the uplink component band, the terminal can identify CFI information from the PDCCH signal that could normally be received in other downlink component bands. Thus, it is possible to reduce the probability that the terminal may set a wrong PUCCH area in each downlink component band when setting PUCCH areas corresponding to a plurality of downlink component bands from the end of the uplink component band in order from the downlink component band associated with the uplink component band set in the terminal while obtaining effects similar to those of Embodiment 2.

Furthermore, according to the present embodiment, even when a plurality of downlink component bands are set in the terminal, it is possible to perform transmission power control of PUCCHs appropriately by using only one downlink component band to notify the PUCCH transmission power control bit.

Furthermore, according to the present embodiment, the base station notifies CFI information using the field of the PUCCH transmission power control bit in the PDCCH signal in addition to notifying of CFI information using the PCFICH signal. That is, since CFI information is notified using an existing control channel, signaling of new control information is unnecessary.

A case has been described in the present embodiment where the base station notifies CFI information of one downlink component band using the field of the PUCCH transmission power control bit in the PDCCH signal. However, according to the present invention, the base station may also notify CFI information of a plurality of downlink component bands using the field of the PUCCH transmission power control bit in the PDCCH signal or notify only part of CFI information of a certain downlink component band.

Furthermore, according to the present embodiment, when, for example, the downlink component band of component band 0 shown in FIG. 10 is in DRX, the base station may allocate the PUCCH transmission power control bit to the field of the PUCCH transmission power control bit in the PDCCH signal of the downlink component band of component band 1. Thus, even when the downlink component band of component band 0 is in DRX, the terminal can appropriately control transmission power of PUCCHs arranged in the uplink component band of component band 0.

Furthermore, the present embodiment has described the setting of one PUCCH in the uplink component band of component band 0 shown in FIG. 10 as an example of the setting of the PUCCH area. However, the present invention sets the PUCCH area for the other PUCCH in the uplink component band of component band 0 and PUCCHs at both ends of the uplink component band of component band 1 shown in FIG. 10 as in the case of the above described embodiment.

Embodiments of the present invention have been described so far. In the above described embodiments, the uplink component band whereby each terminal transmits a PUCCH signal (e.g. ACK/NACK signal) may be called "anchor component carrier," "reference component carrier" or "master component carrier."

Furthermore, a case has been described in the above embodiments where the base station transmits a PDCCH signal directed to each terminal using two downlink component bands. However, in the present invention, the base station may transmit a PDCCH signal to one terminal using, for example, only one downlink component band. In this case, the terminal transmits an ACK/NACK signal using the PUCCH area corresponding to the downlink component band used for transmission of a PDCCH signal in the uplink component band set in the terminal as in the case of the above described embodiments. Thus, it is possible to prevent collision of ACK/NACK signals between LTE terminals using, for example, the same downlink component band. Furthermore, when the base station transmits a PDCCH signal in one downlink component band for each terminal, the downlink component band used for transmission of the PDCCH signal may be called "anchor component carrier," "reference component carrier" or "master component carrier."

Furthermore, a case has been described in the above embodiments where the terminal transmits ACK/NACK signals using PUCCHs arranged in one uplink component band. However, the present invention is also applicable to a case where the terminal transmits ACK/NACK signals using PUCCHs arranged in a plurality of uplink component bands.

Furthermore, band aggregation may also be called "carrier aggregation." Furthermore, band aggregation is not limited to a case where continuous frequency bands are aggregated, but discontinuous frequency bands may also be aggregated.

Furthermore, the present invention may use C-RNTI (Cell-Radio Network Temporary Identifier) as a terminal ID.

The present invention may perform a multiplication between bits (that is, between CRC bits and terminal IDs) or sum up bits and calculate mod 2 of the addition result (that is, remainder obtained by dividing the addition result by 2) as masking (scrambling) processing.

Furthermore, a case has been described in the above embodiments where a component band is defined as a band having a width of maximum 20 MHz and as a basic unit of communication bands. However, the component band may be defined as follows. For example, the downlink component band may also be defined as a band delimited by downlink frequency band information in a BCH (Broadcast Channel) broadcast from the base station, a band defined by a spreading width when a PDCCH is arranged distributed in a frequency domain or a band in which an SCH (synchronization channel) is transmitted in a central part. Furthermore, the uplink component band may also be defined as a band delimited by uplink frequency band information in a BCH broadcast from the base station or a basic unit of communication band having 20 MHz or less including a PUSCH in the vicinity of the center and PUCCHs (Physical Uplink Control Channel) at both ends. Furthermore, the component band may also be represented as "Component carrier."

Furthermore, the correspondence between the uplink component band and the downlink component band may also be defined by uplink information (ul-EARFCN: S-UTRA Absolute Radio Frequency Channel Number) in system information (SIB) notified from the base station to the terminal in the downlink component band. The uplink information in SIB is defined in 3GPP TS36.331 V8.4.0.

Furthermore, nlPucch-AN defined in 3GPP TS36.331 V8.4.0 may be used as the starting position (resource number) of a PUCCH area notified from the base station to the terminal using SIB. In the uplink component band, the value of nlPucch-AN decreases as the PUCCH area is closer to the outside the band (that is, the end). Furthermore, $N_{PUCCH}^{(1)}$ defined in 3GPP TS36.211 V8.5.0 may also be defined as the starting position of the PUCCH area or may also be notified as a relative position from a position offset by resource for CQI transmission $N_{RB}^{(2)}$. In 3GPP TS36.211 V8.5.0, PUCCH resources used by the terminal is represented by the name of a variable called "$n_{PUCCH}^{(1)}$."

Furthermore, in the present invention, the terminal needs to grasp information on the downlink component band in the system to identify the PUCCH area used for transmission of ACK/NACK signals (e.g. number of downlink component bands, bandwidth of each downlink component band or number (ID) of each downlink component band). In the present invention, the information on the downlink component band may be notified with SIB or notified for each terminal. When the information on the downlink component band is notified for each terminal, the base station may notify only information of the downlink component band in which the PUCCH area outside the PUCCH area corresponding to the downlink component band used (or may be used) by the terminal is set in the uplink component band set in the terminal. Thus, the terminal can identify the starting position of the PUCCH area corresponding to each downlink component band and suppress the amount of information on the downlink component band notified from the base station to the terminal to a necessary minimum.

Furthermore, the present invention may limit the number of downlink component bands for which PUCCH areas can be set in one uplink component band. For example, in a system having four downlink component bands and four uplink component bands, the downlink component bands and uplink component bands may be divided into two sets composed of two downlink component bands and two uplink component bands respectively. This limits the number of downlink component bands for which PUCCH areas can be set in one uplink component band to two. In this case, ACK/NACK signals for downlink data transmitted in three or more downlink component bands are transmitted in different sets of two uplink component bands.

Furthermore, a case has been described in the above embodiments where the terminal transmits a plurality of ACK/NACK signals corresponding to downlink data transmitted in a plurality of downlink component bands using different PUCCH areas for each downlink component band. However, the present invention is also applicable to a case where the terminal transmits one ACK/NACK signal for downlink data transmitted in a plurality of downlink component bands (ACK/NACK bundling). Furthermore, the present invention is also applicable to a case where the terminal transmits ACK/NACK signals for downlink data transmitted in a plurality of downlink component bands with one PUCCH area (ACK/NACK resource) selected from among a plurality of PUCCH areas (ACK/NACK resources) (ACK/NACK channel selection or ACK/NACK multiplexing).

Furthermore, an example has been described in the above embodiments where PUCCH areas are set according to the number of CCEs determined based on CFI information. However, according to the present invention, although the relationship between CFI and the number of CCEs slightly differs depending on the number of antennas and the number of PHICHs for each bandwidth of the component band, it is substantially fixed and a CFI-dependent fixed PUCCH area may be set for each bandwidth of the component band. Furthermore, the bandwidth of the component band may also differ from one component band to another.

Furthermore, in the above embodiments, a PUCCH area of a downlink component band associated with a certain uplink component band is set from the end of the uplink component band. Here, RBs used for the PUCCH are assigned indices sequentially from both ends of the component band. That is, RBs are arranged in ascending order of PUCCH resource numbers starting from both ends of the component band. Therefore, the present invention may set a PUCCH area of a downlink component band associated with a certain uplink component band in ascending order of PUCCH resource numbers.

Furthermore, broadcast information (SIB) is transmitted through a channel such as BCH, P-BCH (Primary BCH) or D-BCH (Dynamic BCH).

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-063031, filed on Mar. 16, 2009, including the specification, drawings and abstract, is incorporated herein by reference in its entirety.

INDUSTRIAL APPLICABILITY

The present invention is applicable to a mobile communication system or the like.

REFERENCE SIGNS LIST

100 Base station
200 Terminal
101 Setting section
102 Control section
103 PDCCH generation section
104, 107, 109, 110, 211, 212 Modulation section
105 Allocation section
106 PCFICH generation section
108 Broadcast information generation section
111 Multiplexing section
112, 215 IFFT section
113, 216 CP adding section
114, 217 RF transmitting section
115, 201 Antenna
116, 202 RF receiving section
117, 203 CP removing section
118, 204 FFT section
119 Extraction section
120 IDFT section
121 Data receiving section
122 ACK/NACK receiving section
205 Demultiplexing section
206 Broadcast information receiving section
207 Setting information receiving section
208 PCFICH receiving section
209 PDCCH receiving section
210 PDSCH receiving section
213 DFT section
214 Mapping section

The invention claimed is:

1. A base station, comprising:
a transmitter, which, in operation, transmits on a first downlink component carrier first downlink control information including a first transmission power control (TPC) field related to a Physical Uplink Control Channel (PUCCH) and first downlink data, and transmits on a second downlink component carrier second downlink control information including a second TPC field related to the PUCCH and second downlink data; and
a receiver, which, in operation, receives an ACK/NACK response signal on a first uplink component carrier associated with the first downlink component carrier, the ACK/NACK response signal being mapped into a position of a resource of the PUCCH determined using the second TPC field and being transmitted at a transmission power determined from the first TPC field.

2. The base station according to claim 1, wherein the second downlink control information includes resource assignment information indicating a resource allocated to the second downlink data transmitted on the second downlink component carrier.

3. The base station according to claim 1, wherein the ACK/NACK response signal includes ACK/NACK for the first downlink data transmitted on the first downlink component carrier and ACK/NACK for the second downlink data transmitted on the second downlink component carrier.

4. A communication method, comprising:
transmitting on a first downlink component carrier first downlink control information including a first transmission power control (TPC) field related to a Physical Uplink Control Channel (PUCCH) and first downlink data;
transmitting on a second downlink component carrier second downlink control information including a second TPC field related to the PUCCH and second downlink data; and
receiving an ACK/NACK response signal on a first uplink component carrier associated with the first downlink component carrier, the ACK/NACK response signal being mapped into a position of a resource of the PUCCH determined using the second TPC field and being transmitted at a transmission power determined from the first TPC field.

5. The communication method according to claim 4, wherein the second downlink control information includes resource assignment information indicating a resource allocated to the second downlink data transmitted on the second downlink component carrier.

6. The communication method according to claim 4, wherein the ACK/NACK response signal includes ACK/NACK for the first downlink data transmitted on the first downlink component carrier and ACK/NACK for the second downlink data transmitted on the second downlink component carrier.

7. The base station according to claim 1, wherein the transmitter, in operation, transmits on the first downlink component carrier information associated with the first downlink component carrier, and transmits on the second downlink component carrier information associated with the second downlink component carrier.

8. The communication method according to claim 4, further comprising:
- transmitting on the first downlink component carrier information associated with the first downlink component carrier; and
- transmitting on the second downlink component carrier information associated with the second downlink component carrier.

* * * * *